(12) United States Patent
Kim et al.

(10) Patent No.: US 12,107,217 B2
(45) Date of Patent: Oct. 1, 2024

(54) ELECTROLYTE MEMBRANE FOR LITHIUM SECONDARY BATTERY AND MEMBRANE-ELECTRODE STRUCTURE FOR LITHIUM SECONDARY BATTERY HAVING THE SAME

(71) Applicant: RESEARCH & BUSINESS FOUNDATION SUNGKYUNKWAN UNIVERSITY, Suwon-si (KR)

(72) Inventors: Duk Joon Kim, Seoul (KR); Hai Anh Hoang, Suwon-si (KR); Su Gyeong Kim, Incheon (KR); Anh Le Mong, Suwon-si (KR); Zhenchuan Tian, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 804 days.

(21) Appl. No.: 17/073,745

(22) Filed: Oct. 19, 2020

(65) Prior Publication Data

US 2021/0313620 A1    Oct. 7, 2021

(30) Foreign Application Priority Data

Mar. 25, 2020    (KR) .......................... 10-2020-0035979

(51) Int. Cl.
*H01M 10/05*    (2010.01)
*C08F 283/06*    (2006.01)
(Continued)

(52) U.S. Cl.
CPC ....... *H01M 10/0565* (2013.01); *C08F 283/06* (2013.01); *C08K 3/105* (2018.01);
(Continued)

(58) Field of Classification Search
None
See application file for complete search history.

(56) References Cited

FOREIGN PATENT DOCUMENTS

| JP | 2006310159 | * 11/2006 | ............. C08G 65/34 |
| JP | 2009238515 | * 10/2009 | ............. B82Y 30/00 |
| KR | 102055265 | * 12/2019 | ........ H01M 10/0525 |

OTHER PUBLICATIONS

Mong Anh, Le, et al., "Solid electrolyte membrane prepared from poly (arylene ether sulfone)-g-Poly (ethylene glycol) for lithium secondary battery." ACS Applied Energy Materials, vol. 2.4 (2019); pp. 2585-2595. (Year: 2019).*

(Continued)

*Primary Examiner* — Maria Laios
*Assistant Examiner* — Angela J Martin
(74) *Attorney, Agent, or Firm* — NSIP Law

(57) ABSTRACT

Disclosed is an electrolyte membrane for a lithium secondary battery including a compound in which PEG is grafted to PAES or PAEK as a main chain or a block copolymer between PAES or PAEK and PEG, thereby to have excellent ionic conductivity and adhering property. Disclosed is a binder for a lithium secondary battery including a compound in which PEG is grafted to PAES or PAEK as a main chain or a block copolymer between PAES or PAEK and PEG, thereby to have excellent ionic conductivity and adhering property. Further, disclosed is a membrane-electrode structure for lithium secondary batteries having the electrolyte membrane and the binder. Further, disclosed is a manufacturing method of each of the electrolyte membrane, the binder, and the structure.

13 Claims, 26 Drawing Sheets

Structure of PAES-g-PEG copolymer

Structure of PAEK-g-PEG copolymer

Structure of PAES-b-PEG copolymer (block copolymer)

Structure of PAEK-b-PEG copolymer (block copolymer)

(51) Int. Cl.
*C08K 3/105* (2018.01)
*C08K 3/22* (2006.01)
*C08K 5/41* (2006.01)
*H01M 4/62* (2006.01)
*H01M 10/0525* (2010.01)
*H01M 10/0565* (2010.01)

(52) U.S. Cl.
CPC .................. *C08K 3/22* (2013.01); *C08K 5/41* (2013.01); *H01M 4/622* (2013.01); *H01M 10/0525* (2013.01); *C08K 2003/2203* (2013.01); *C08K 2003/2262* (2013.01); *C08K 2003/2289* (2013.01); *C08K 2003/2293* (2013.01); *H01M 2300/0082* (2013.01)

(56) References Cited

OTHER PUBLICATIONS

Mong Anh, Le, et al. "Solid electrolyte membrane prepared from poly (arylene ether sulfone)-g-Poly (ethylene glycol) for lithium secondary battery." *ACS Applied Energy Materials vol.* 2.4 (2019): pp. 2585-2595.

\* cited by examiner

Structure of PAES-g-PEG copolymer

Structure of PAEK-g-PEG copolymer

Structure of PAES-b-PEG copolymer (block copolymer)

Structure of PAEK-b-PEG copolymer (block copolymer)

US 12,107,217 B2

ELECTROLYTE MEMBRANE FOR LITHIUM SECONDARY BATTERY AND MEMBRANE-ELECTRODE STRUCTURE FOR LITHIUM SECONDARY BATTERY HAVING THE SAME

CROSS-REFERENCE TO RELATED APPLICATIONS

This application claims the benefit under 35 USC § 119(a) of Korean Patent Application No. 10-2020-0035979 filed on Mar. 25, 2020, respectively, in the Korean Intellectual Property Office, the entire disclosures of which are incorporated herein by reference for all purposes.

BACKGROUND

1. Field

The present disclosure relates to an electrolyte membrane for a lithium secondary battery including a compound in which PEG is grafted to PAES or PAEK as a main chain or a block copolymer between PAES or PAEK and PEG, thereby to have excellent ionic conductivity and adhering property. Further, the present disclosure relates to a binder for a lithium secondary battery including a compound in which PEG is grafted to PAES or PAEK as a main chain or a block copolymer between PAES or PAEK and PEG, thereby to have excellent ionic conductivity and adhering property. Further, the present disclosure relates to a membrane-electrode structure for lithium secondary batteries having the electrolyte membrane and the binder. Further, the present disclosure relates to a manufacturing method of each of the electrolyte membrane, the binder, and the structure.

2. Description of Related Art

In a lithium secondary battery, lithium ions move from a negative electrode through an electrolyte to a positive electrode during discharge, and back when charging. The battery is light and has a high energy density, and has been used in various fields such as a mobile phone, a laptop, an energy storage system (ESS), and an electric vehicle. The lithium secondary battery is basically composed of a positive-electrode, a negative-electrode, a liquid electrolyte and a separator. However, the liquid electrolyte is vulnerable to ignition, explosion, and leakage due to a decomposition reaction. Recently, an all-solid-state battery using a solid electrolyte has been attracting attention as a solution for solve the problem of the liquid electrolyte.

The all-solid-state battery using the solid electrolyte has a very high stability. At the same time, a size of the all-solid-state battery is smaller than that when using the liquid electrolyte, thereby increasing an energy density per volume. However, because the solid electrolyte is used, lithium ionic conductivity is lower than that when using the liquid electrolyte. Further, performance of the battery is poor because contact between the solid electrolyte and an electrode is poor. For example, polyvinylidene fluoride (PVDF) as a binder material for a lithium secondary battery that is currently commercialized has good electrochemical stability and strong adhesion. However, a positive-electrode including the PVDF binder has poor adhesion with a solid electrolyte membrane and has high resistance, which in turn degrades performance and stability of the battery. Therefore, there is a need to develop a new material that may be applied to a solid electrolyte membrane and a positive-electrode binder to allow the solid electrolyte membrane and the positive-electrode binder to have high ionic conductivity and excellent adhesion.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide an electrolyte membrane for a lithium secondary battery having a high ionic conductivity based on a grafted copolymer or a block copolymer forming a lithium ion transfer channel, and a manufacturing method thereof.

Another purpose of the present disclosure is to provide a binder which may lower an interfacial resistance between an electrolyte membrane and an electrode of a lithium secondary battery, and a manufacturing method thereof.

Another purpose of the present disclosure is to provide a membrane-electrode structure containing a binder made of the same material as the electrolyte membrane for the lithium secondary battery, such that the structure has high ionic conductivity and excellent adhesion between the membrane and the electrode.

A first aspect of the present disclosure provides an electrolyte membrane for a lithium secondary battery, wherein the electrolyte membrane has a lithium ion transfer channel, and wherein the electrolyte membrane contains: a compound represented by one of following Chemical Formulas 1 to 4; and a lithium salt:

[Chemical Formula 1]

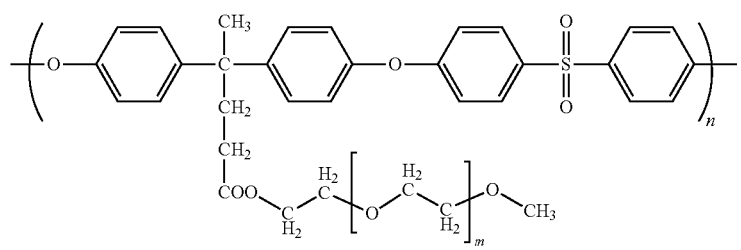

-continued

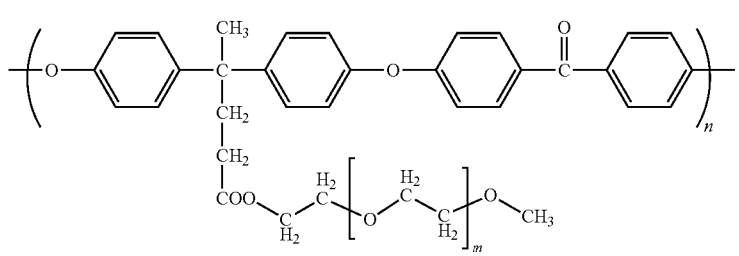
[Chemical Formula 2]

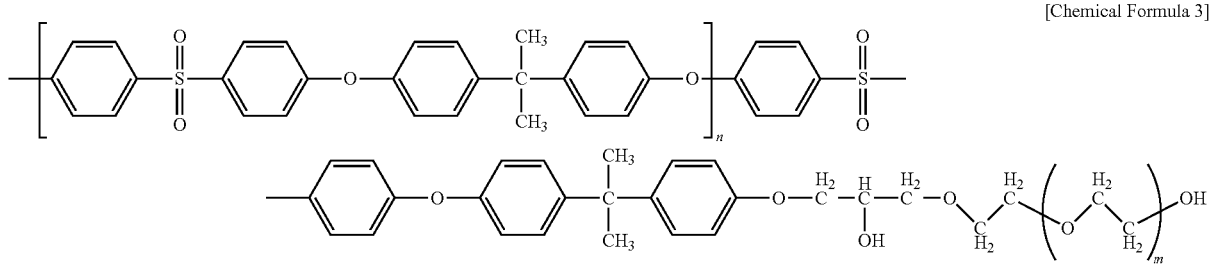
[Chemical Formula 3]

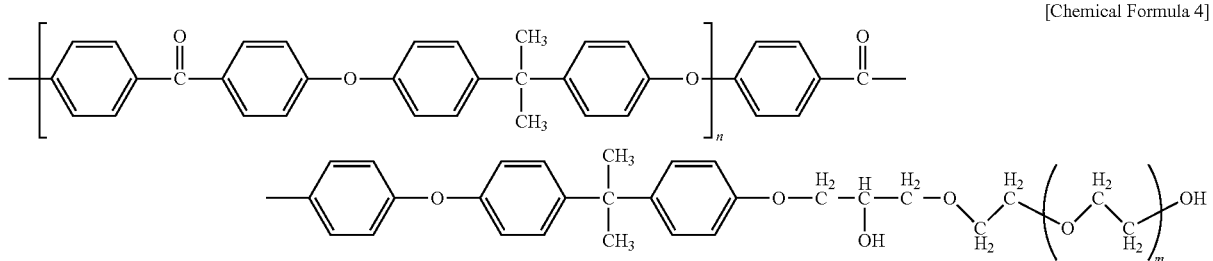
[Chemical Formula 4]

where in the Chemical Formulas 1 to 4, m represents an integer of 45 to 90, and n represents an integer of 50 to 70.

In one implementation of the electrolyte membrane, the lithium salt includes one selected from a group consisting of LiTFSl (lithium bis(trifluoromethanesulfonyl)), $LiPF_6$, $LiBF_4$, $LiSbF_6$ and $LiAsF$.

In one implementation of the electrolyte membrane, the lithium salt has a content of 10 to 50 weight % based on a total weight of the electrolyte membrane.

In one implementation of the electrolyte membrane, the lithium salt has a content of 40 to 50 weight % based on a total weight of the electrolyte membrane.

A second aspect of the present disclosure provides a binder for a lithium secondary battery, wherein the binder has a lithium ion transfer channel, and wherein the binder contains: a compound represented by one of following Chemical Formulas 1 to 4; and a lithium salt:

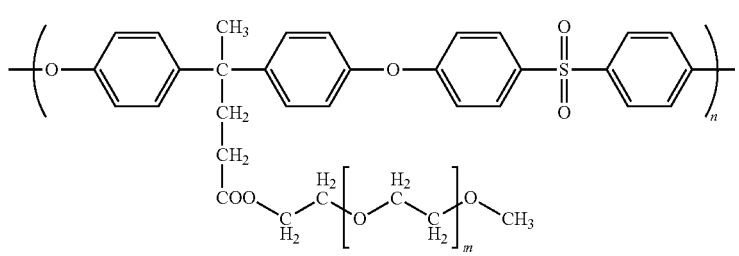
[Chemical Formula 1]

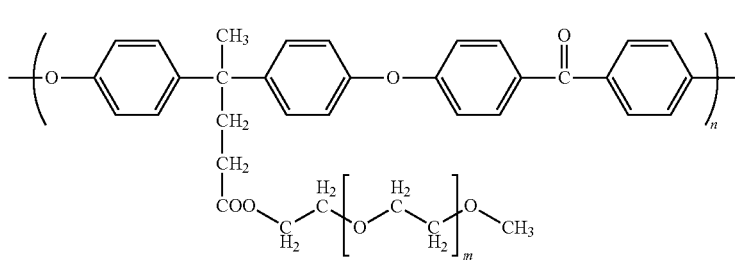
[Chemical Formula 2]

[Chemical Formula 3]

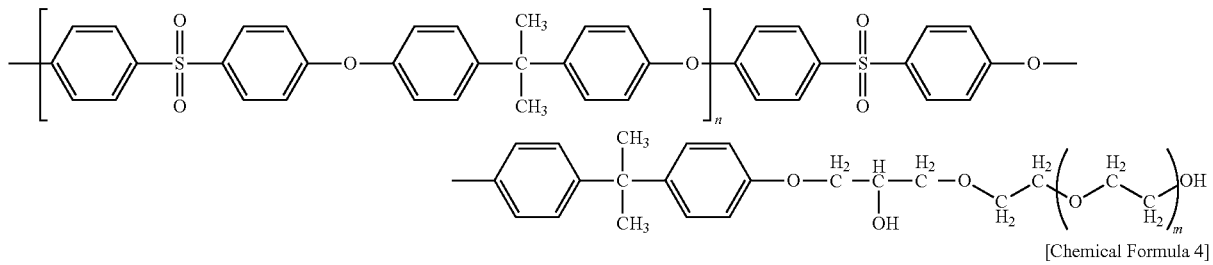

[Chemical Formula 4]

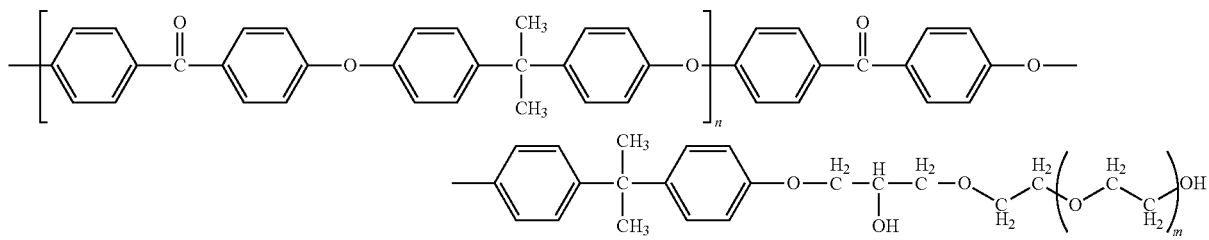

where in the Chemical Formulas 1 to 4, m represents an integer of 45 to 90, and n represents an integer of 50 to 70.

In one implementation of the binder, the lithium salt includes one selected from a group consisting of LiTFSl (lithium bis(trifluoromethanesulfonyl)), $LiPF_6$, $LiBF_4$, $LiSbF_6$ and LiAsF.

In one implementation of the binder, the lithium salt has a content of 10 to 50 weight % based on a total weight of the binder.

In one implementation of the binder, the lithium salt has a content of 40 to 50 weight % based on a total weight of the binder.

A third aspect of the present disclosure provides a membrane-electrode structure for a lithium secondary battery, wherein the structure has a lithium ion transfer channel, and wherein the structure includes: an electrolyte membrane containing: a compound represented by one of following Chemical Formulas 1 to 4; and a lithium salt; a binder having the same composition as the electrolyte membrane; and an electrode binding to the electrolyte membrane via the binder:

[Chemical Formula 1]

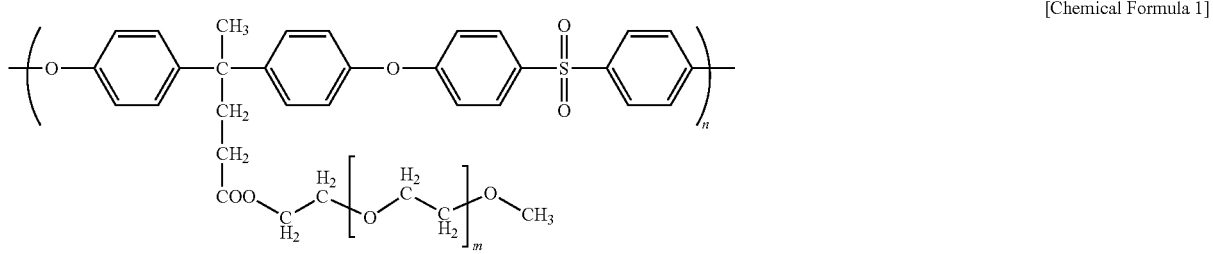

[Chemical Formula 2]

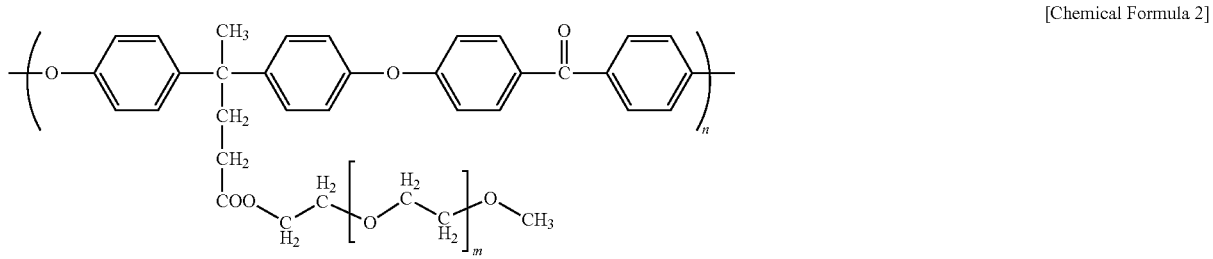

[Chemical Formula 3]

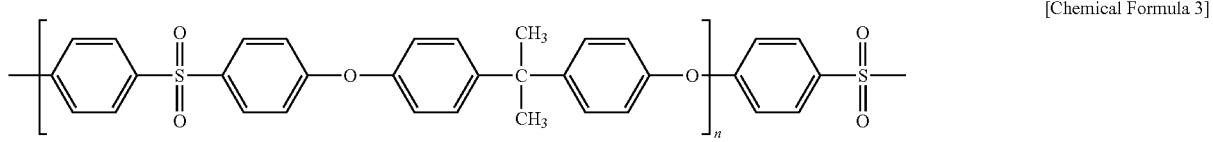

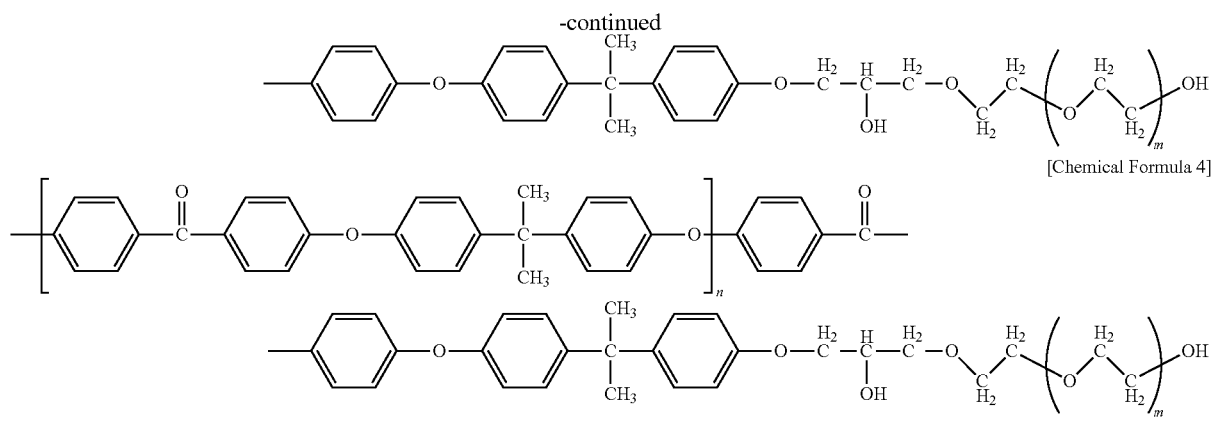

[Chemical Formula 4]

where in the Chemical Formulas 1 to 4, m represents an integer of 45 to 90, and n represents an integer of 50 to 70.

In one implementation of the membrane-electrode structure, an interfacial resistance of the binder with the electrolyte membrane is in a range of 1800 to 2100Ω.

In one implementation of the membrane-electrode structure, the lithium salt includes one selected from a group consisting of LiTFSl (lithium bis(trifluoromethanesulfonyl)), $LiPF_6$, $LiBF_4$, $LiSbF_6$ and $LiAsF$.

In one implementation of the membrane-electrode structure, the lithium salt has a content of 10 to 50 weight % based on a total weight of the structure.

In one implementation of the membrane-electrode structure, the lithium salt has a content of 40 to 50 weight % based on a total weight of the structure.

A fourth aspect of the present disclosure provides a manufacturing method of a electrolyte membrane for a lithium secondary battery, the method including a first step of preparing a compound represented by one of following Chemical Formulas 1 to 4, and a second step of dissolving the compound and a lithium salt in an organic solvent to form a mixed solution, and a third step of casting and drying the mixed solution on a substrate, wherein the electrolyte membrane has a lithium ion transfer channel formed therein:

[Chemical Formula 1]

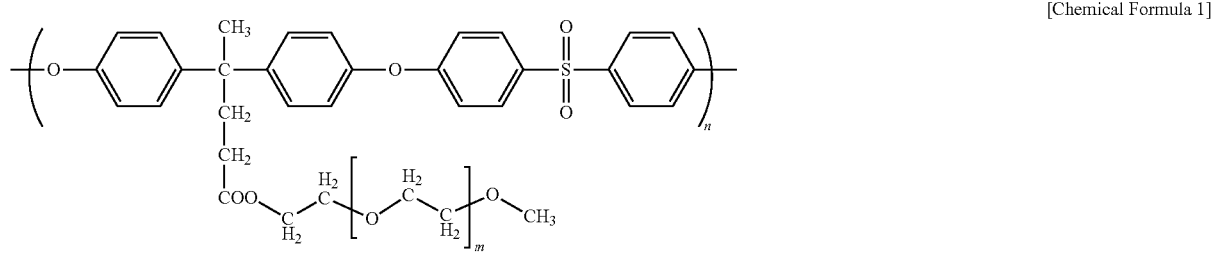

[Chemical Formula 2]

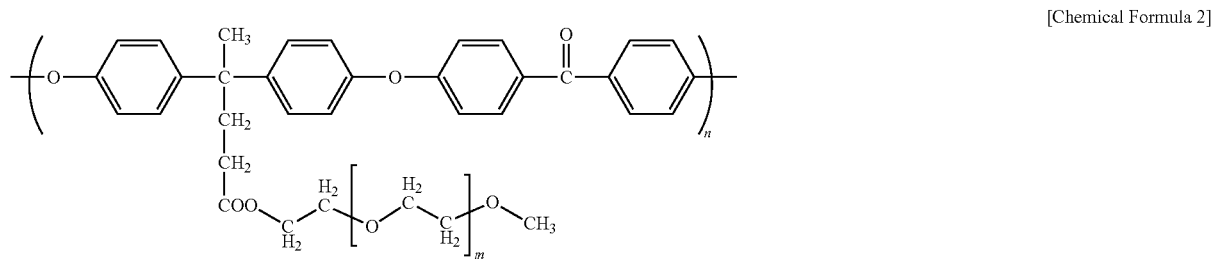

[Chemical Formula 3]

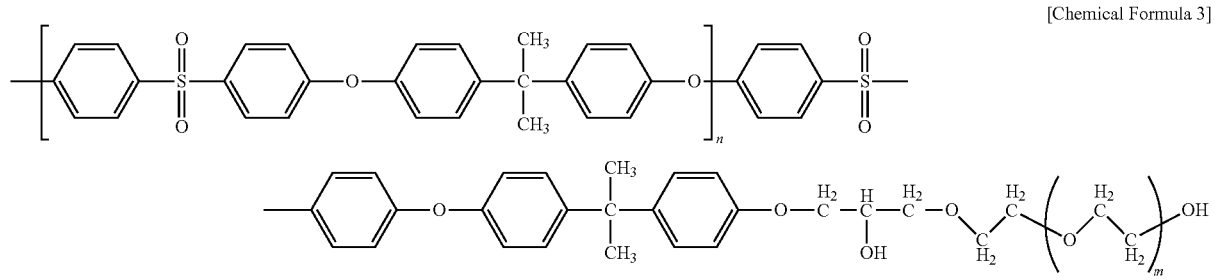

[Chemical Formula 4]

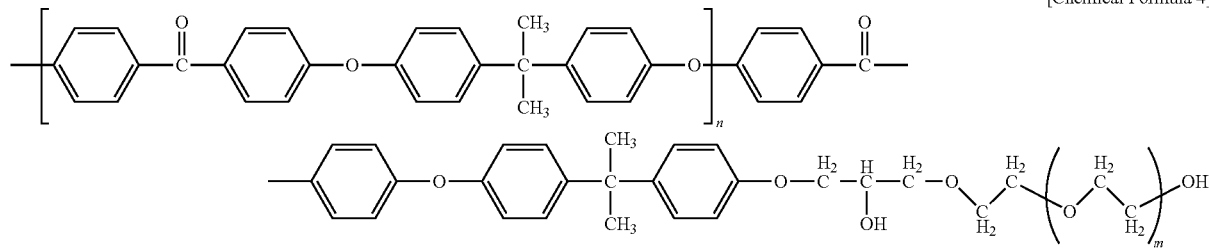

where in the Chemical Formulas 1 to 4, m represents an integer of 45 to 90, and n represents an integer of 50 to 70.

In one implementation of the manufacturing method of the electrolyte membrane, the lithium salt includes one selected from a group consisting of LiTFSl (lithium bis(trifluoromethanesulfonyl)), $LiPF_6$, $LiBF_4$, $LiSbF_6$ and LiAsF.

In one implementation of the manufacturing method of the electrolyte membrane, the lithium salt has a content of 10 to 50 weight % based on a total weight of the electrolyte membrane.

In one implementation of the manufacturing method of the electrolyte membrane, the lithium salt has a content of 40 to 50 weight % based on a total weight of the electrolyte membrane.

In one implementation of the manufacturing method of the electrolyte membrane, the organic solvent may be tetrahydrofuran (THF).

A fifth aspect of the present disclosure provides a manufacturing method of a binder for a lithium secondary battery, the method including a first step of preparing a compound represented by one of following Chemical Formulas 1 to 4, and a second step of dissolving the compound and a lithium salt in an organic solvent to form a mixed solution, and a third step of casting and drying the mixed solution on a substrate, wherein the binder has a lithium ion transfer channel formed therein:

[Chemical Formula 1]

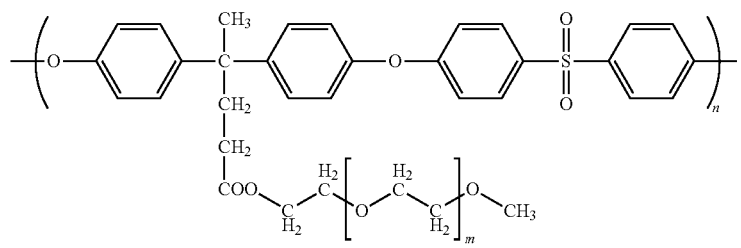

[Chemical Formula 2]

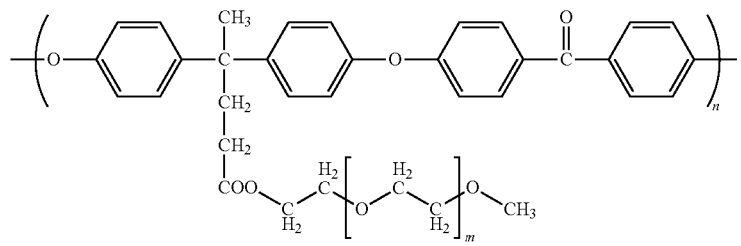

[Chemical Formula 3]

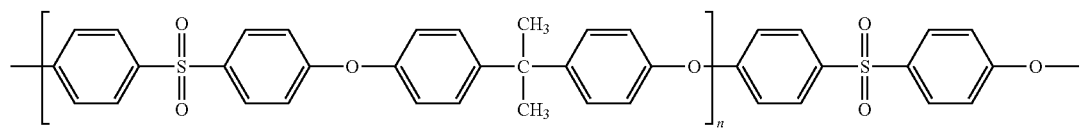

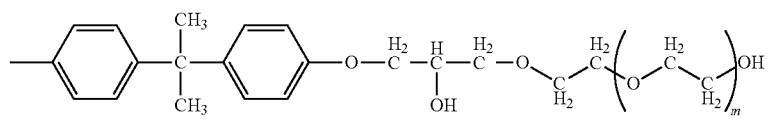

[Chemical Formula 4]

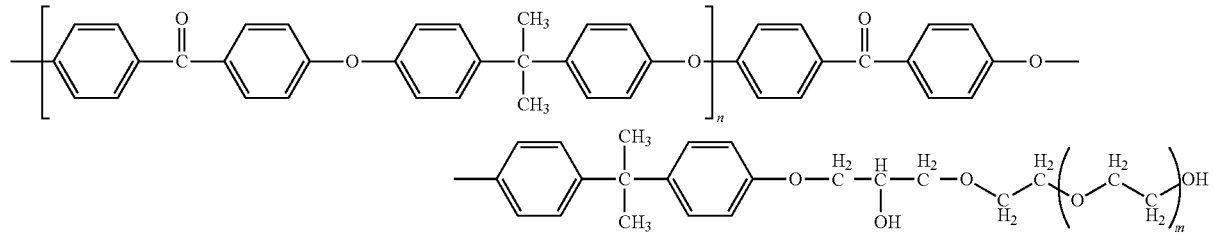

where in the Chemical Formulas 1 to 4, m represents an integer of 45 to 90, and n represents an integer of 50 to 70.

In one implementation of the manufacturing method of the binder, the lithium salt includes one selected from consisting of LiTFSl (lithium a group bis(trifluoromethanesulfonyl)), $LiPF_6$, $LiBF_4$, $LiSbF_6$ and LiAsF.

In one implementation of the manufacturing method of the binder, the lithium salt has a content of 10 to 50 weight % based on a total weight of the binder.

In one implementation of the manufacturing method of the binder, the lithium salt has a content of 40 to 50 weight % based on a total weight of the binder.

In one implementation of the manufacturing method of the binder, the organic solvent may be tetrahydrofuran (THF).

According to the present disclosure, the electrolyte membrane having excellent mechanical strength and lithium ionic conductivity may be realized by containing a compound in which PEG is grafted to PAES or PAEK as a main chain or a block copolymer between PAES or PAEK and PEG, and the lithium salt, and thus having the lithium ion transfer channel formed therein. In this connection, the lithium ionic conductivity may be easily controlled by varying the weight % of the lithium salt. Further, when the binder has the same composition as the electrolyte membrane, the lithium ions may be easily brought into a conductive state, compared to a case when the conventional PVDF binder is used. Furthermore, when the binder has the same composition as the electrolyte membrane, a high adhesive force between the electrolyte membrane and the electrode and a low interfacial resistance between the electrolyte membrane and the electrode may be achieved.

Further, the electrolyte membrane and binder according to the present disclosure have excellent adhesion with aluminum foil, and thus allow a simple constructed all-solid-state battery with improved battery performance and stability to be manufactured in a simple manner.

In addition to the effects as described above, specific effects according to the present disclosure will be described together with the detailed description for carrying out the disclosure.

BRIEF DESCRIPTION OF DRAWINGS

FIGS. 2A and 2B are diagrams showing $^1$H-NMR spectra of PAES-COOH and PAES-g-PEG, respectively. FIG. 2C is a diagram showing a PAES-g-PEG FT-IR spectrum.

FIG. 5A to 5D shows a positive-electrode surface SEM image, and FIGS. 5E and 5F are a positive-electrode cross-sectional SEM image. Specifically, FIG. 5A is directed to a $LiCoO_2$/PVDF binder, FIG. 5B is directed to a $LiCoO_2$/PAES-g-PEG binder, FIG. 5C is directed to a $LiNiMnCoO_2$/PVDF binder, and FIG. 5D is directed to a $LiNiMnCoO_2$/PAES-g-PEG binder. FIG. 5E is directed to a $LiCoO_2$/PAES-g-PEG binder and FIG. 5F is directed to a $LiNiMnCoO_2$/PAES-g-PEG binder.

FIG. 6A is directed to a $LiCoO_2$/PAES-g-PEG binder, and FIG. 6B is directed to a $LiNiMnCoO_2$/PAES-g-PEG binder.

FIG. 7 shows an interfacial resistance of each of a PAES-g-PEG binder and a PVDF binder with a PAES-g-PEG solid electrolyte membrane.

FIG. 9A shows adhesion of a PAES-g-PEG binder with an aluminum foil, FIG. 9(B) shows adhesion of a PAES-g-PEG binder to a positive-electrode using $LiCoO_2$, FIG. 9(C) shows adhesion of a PAES-g-PEG binder to a positive-electrode using $LiNiMnCoO_2$, and FIG. 9(D) shows adhesion of a PAES-g-PEG binder to a positive-electrode using sulfur/CNT.

FIG. 10A to FIG. 12C are respectively voltage-current graphs showing results of evaluation of suitability of a PAES-g-PEG binder for a PAES-g-PEG electrolyte membrane according to the present disclosure of Experimental Example H according to the present disclosure. FIG. 10A-10E is a voltage-current graph of a positive-electrode using LiCoO$_2$ and a PAES-g-PEG binder containing a LiTFSl salt of each of various concentrations in an all-solid-state battery system. FIG. 12A-12C is a voltage-current graph at a varying ratio between sulfur and CNT in an all-solid-state battery system.

DETAILED DESCRIPTIONS

Figure 1:
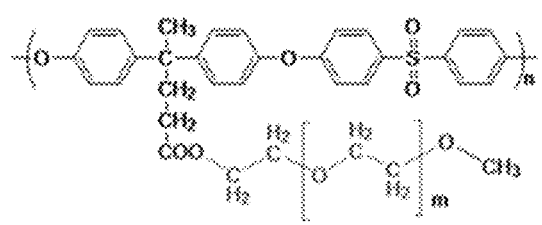
FIG. 1 shows compounds according to the present disclosure.
Figure 1:
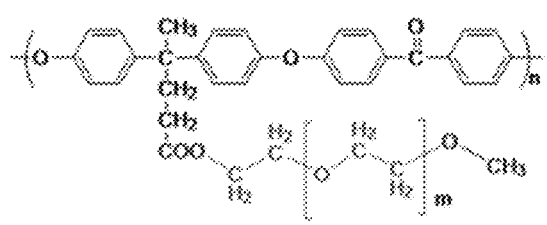
Figure 1:
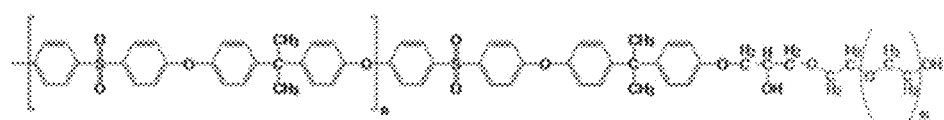
Figure 1:
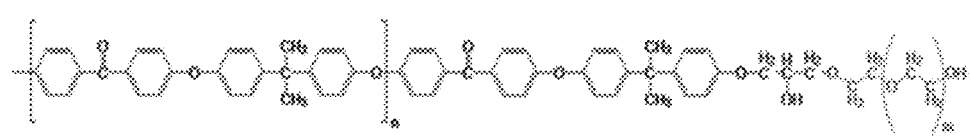

Examples of various embodiments are illustrated and described further below. It will be understood that the description herein is not intended to limit the claims to the specific embodiments described. On the contrary, it is intended to cover alternatives, modifications, and equivalents as may be included within the spirit and scope according to the present disclosure as defined by the appended claims.

Further, descriptions and details of well-known steps and elements are omitted for simplicity of the description. Furthermore, in the following detailed description of the present disclosure, numerous specific details are set forth in order to provide a thorough understanding according to the present disclosure. However, it will be understood that the present disclosure may be practiced without these specific details. In other instances, well-known methods, procedures, components, and circuits have not been described in detail so as not to unnecessarily obscure aspects according to the present disclosure.

The terminology used herein is for the purpose of describing particular embodiments only and is not intended to be limiting according to the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, Chemical Formula 1 to Chemical Formula 4 as described in the present disclosure are defined as having following structures respectively:

[Chemical Formula 1]

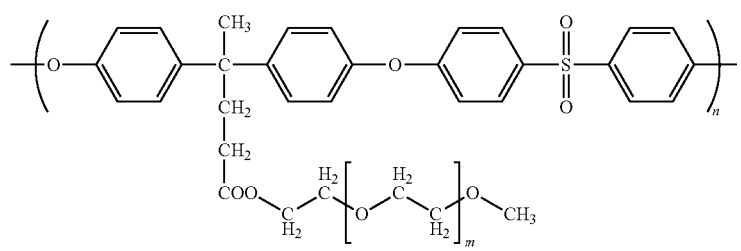

[Chemical Formula 2]

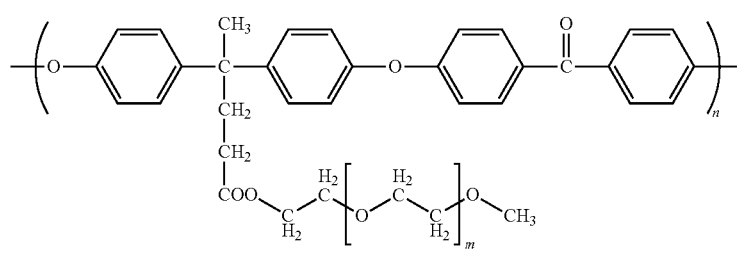

[Chemical Formula 3]

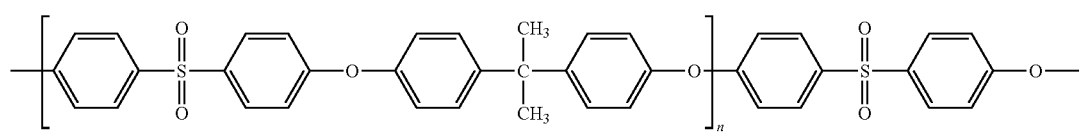

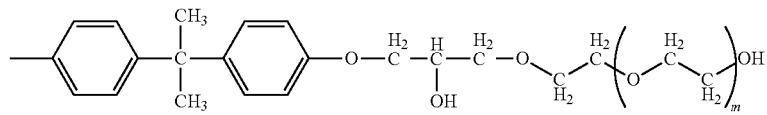

[Chemical Formula 4]

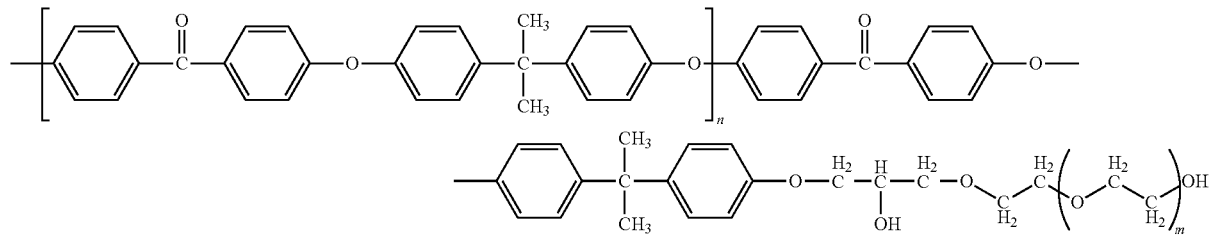

where in the Chemical Formulas 1 to 4, m represents an integer of 45 to 90, and n represents an integer of 50 to 70.

In following detailed descriptions of the present disclosure, for convenience of descriptions, the above structures of the Chemical Formula 1 to the Chemical Formula 4 will be omitted. Therefore, it should be understood that the Chemical Formula 1 to Chemical Formula 4 as described in the present disclosure have the structures as described above, respectively.

Further, a compound represented by each of the Chemical Formulas 1 to 4 as described has following characteristics.

The compound may have a structure in which polyethylene glycol (hereinafter referred to as PEG) binds to a poly(arylene ether sulfone) (hereinafter referred to as PAES) or poly(arylene ether ketone) (hereinafter referred to as PAEK) as a main chain.

Specifically, each of compounds represented by each of the Chemical Formulas 1 and 2 may be a copolymer in which COOH of each of PAES and PAEK reacts with OH of PEG such that PEG is grafted to each of PAES and PAEK. The compound represented by the Chemical Formula 1 may be a copolymer in which PEG is grafted to PAES. The compound represented by the Chemical Formula 2 may be a copolymer in which PEG is grafted to PAEK.

Each of compounds represented by each of the Chemical Formulas 3 and 4 may be each of a block copolymer between PAES and PEG and a block copolymer between PAEK and PEG. The compound represented by the Chemical Formula 3 may have a structure in which phase separation occurs clearly within the compound structure and may be a block copolymer between PAES and PEG. The compound represented by the Chemical Formula 4 may have a structure in which phase separation occurs clearly within the compound structure and may be a block copolymer between PAEK and PEG.

Each of the PAES and PAEK has excellent thermal and mechanical stabilities. Thus, when the PAES and PAEK are introduced into the lithium secondary battery, they have a mechanical strength that may withstand change in a volume of an active material and a conductive agent during discharge.

The compound may have improved conductive characteristics due to the PEG. Specifically, the PEG has an ether group (—O—) in a chain and binds with lithium ions due to the ether group, and thus may perform excellent interaction with the lithium salt. Further, lithium ions may be brought into a conductive state due to segmentation motion of the PEG.

In the detailed description of the present disclosure, it should be understood that the compound represented by any one of the Chemical Formulas 1 to 4 has the above characteristics.

Electrolyte Membrane for Lithium Secondary Battery and Manufacturing Method Thereof The electrolyte membrane for the lithium secondary battery according to the present disclosure contains the compound represented by one of the Chemical Formulas 1 to 4, and the lithium salt, and has a lithium ion transfer channel.

The lithium salt may be used as a supply source of lithium ions in a lithium secondary battery. The lithium salt includes one selected from a group consisting of LiTFSl (lithium bis(trifluoromethanesulfonyl)), $LiPF_6$, $LiBF_4$, $LiSbF_6$ and LiAsF.

In one embodiment, the lithium salt may be LiTFSl.

In the electrolyte membrane for the lithium secondary battery, the lithium salt may interact with an ether group (—O—) in a chain of the PEG of the compound to form a channel capable of delivering lithium ions.

The electrolyte membrane for the lithium secondary battery may control the lithium ionic conductivity of the electrolyte membrane by adjusting the ratio of a weight of the lithium salt to a weight of the electrolyte membrane. As the ratio of the weight of the lithium salt to the weight of the membrane increases, the number of lithium ions that may be moved via the segmentation movement of the PEG chain increases, so that the lithium ionic conductivity may be improved.

In one implementation of the electrolyte membrane, the lithium salt has a content of 10 to 50 weight % based on a total weight of the electrolyte membrane. When the content of the lithium salt is smaller than about 10%, the introduction of the lithium salt has little influence on the activation of the segmental movement of the polyethylene glycol. When the content of the lithium salt is greater than about 50%, the excessive lithium salt interferes with the segmentation movement of the PEG chain, thereby reducing the effective number of transported lithium ions. Thus, the lithium ionic conductivity decreases. Thus, the lithium salt has a content of 10 to 50 weight % based on a total weight of the electrolyte membrane. In one implementation of the electrolyte membrane, the lithium salt has a content of 40 to 50 weight % based on a total weight of the electrolyte membrane.

The method of manufacturing the electrolyte membrane for the lithium secondary battery according to the present disclosure includes a first step of preparing a compound represented by one of the Chemical Formulas 1 to 4, a second step of dissolving the compound and the lithium salt in an organic solvent to form a mixed solution, and a third step of casting and drying the mixed solution on a substrate to form the membrane, wherein the lithium ion transfer channel is formed in the membrane.

In the first step, the compound may be the copolymer in which PEG is grafted to PAES and PAEK as the main chain or may be a block copolymer between PAES and PEG or PAEK and PEG.

In the second step, the organic solvent may include a solvent capable of dissolving the compound and the lithium salt. For example, the organic solvent may be tetrahydrofuran (THF).

In the second step, the lithium salt may be a material that may be used as a source for supplying lithium ions, and the lithium salt may be LiTFSl.

In the second step, the lithium salt has a content of 10 to 50 weight % based on a total weight of the electrolyte membrane. When the content of the lithium salt is smaller than about 10%, the introduction of the lithium salt has little influence on the activation of the segmental movement of the polyethylene glycol. When the content of the lithium salt is greater than about 50%, the excessive lithium salt interferes with the segmentation movement of the PEG chain, thereby reducing the effective number of transported lithium ions. Thus, the lithium ionic conductivity decreases. Thus, the lithium salt has a content of 10 to 50 weight % based on a total weight of the electrolyte membrane. In one implementation of the electrolyte membrane, the lithium salt has a content of 40 to 50 weight % based on a total weight of the electrolyte membrane.

In one embodiment, when manufacturing the electrolyte membrane using LiTFSl as the lithium salt, the interaction between the LiTFSl and the compound may occur and thus a channel capable of delivering lithium ions may be formed.

Binder for Lithium Secondary Battery and Manufacturing Method Thereof

The binder for the lithium secondary battery according to the present disclosure contains the compound represented by one of the Chemical Formulas 1 to 4, and the lithium salt, and has a lithium ion transfer channel.

The lithium salt may be used as a supply source of lithium ions in a lithium secondary battery. The lithium salt includes one selected from a group consisting of LiTFSl (lithium bis(trifluoromethanesulfonyl)), $LiPF_6$, $LiBF_4$, $LiSbF_6$ and LiAsF.

In one embodiment, the lithium salt may be LiTFSl.

In the binder for the lithium secondary battery, the lithium salt may interact with an ether group (—O—) in a chain of the PEG of the compound to form a channel capable of delivering lithium ions.

The binder for the lithium secondary battery may control the lithium ionic conductivity of the binder by adjusting the ratio of a weight of the lithium salt to a weight of the binder. As the ratio of the weight of the lithium salt to the weight of the binder increases, the number of lithium ions that may be moved via the segmentation movement of the PEG chain increases, so that the lithium ionic conductivity may be improved.

In one implementation of the binder, the lithium salt has a content of 10 to 50 weight % based on a total weight of the binder. When the content of the lithium salt is smaller than about 10%, the introduction of the lithium salt has little influence on the activation of the segmental movement of the polyethylene glycol. When the content of the lithium salt is greater than about 50%, the excessive lithium salt interferes with the segmentation movement of the PEG chain, thereby reducing the effective number of transported lithium ions. Thus, the lithium ionic conductivity decreases. Thus, the lithium salt has a content of 10 to 50 weight % based on a total weight of the binder. In one implementation of the binder, the lithium salt has a content of 40 to 50 weight % based on a total weight of the binder.

The method of manufacturing the binder for the lithium secondary battery according to the present disclosure includes a first step of preparing a compound represented by one of the Chemical Formulas 1 to 4, a second step of dissolving the compound and the lithium salt in an organic solvent to form a mixed solution, and a third step of casting and drying the mixed solution on a substrate to form the binder, wherein the lithium ion transfer channel is formed in the binder.

In the first step, the compound may be the copolymer in which PEG is grafted to PAES and PAEK as the main chain or may be a block copolymer between PAES and PEG or PAEK and PEG.

In the second step, the organic solvent may include a solvent capable of dissolving the compound and the lithium salt. For example, the organic solvent may be tetrahydrofuran (THF).

In the second step, the lithium salt may be a material that may be used as a source for supplying lithium ions, and the lithium salt may be LiTFSl.

In the second step, the lithium salt has a content of 10 to 50 weight % based on a total weight of the binder. When the content of the lithium salt is smaller than about 10%, the introduction of the lithium salt has little influence on the activation of the segmental movement of the polyethylene glycol. When the content of the lithium salt is greater than about 50%, the excessive lithium salt interferes with the segmentation movement of the PEG chain, thereby reducing the effective number of transported lithium ions. Thus, the lithium ionic conductivity decreases. Thus, the lithium salt has a content of 10 to 50 weight % based on a total weight of the binder. In one implementation of the binder, the lithium salt has a content of 40 to 50 weight % based on a total weight of the binder.

In one embodiment, when manufacturing the binder using LiTFSl as the lithium salt, the interaction between the LiTFSl and the compound may occur and thus a channel capable of delivering lithium ions may be formed.

Membrane-Electrode Structure for Lithium Secondary Battery

The membrane-electrode structure for the lithium secondary battery according to the present disclosure has a lithium ion transfer channel, and includes: an electrolyte membrane containing: a compound represented by one of the following Chemical Formulas 1 to 4; and a lithium salt; a binder having the same composition as the electrolyte membrane; and an electrode binding to the electrolyte membrane via the binder.

The lithium salt may be used as a supply source of lithium ions in a lithium secondary battery. The lithium salt includes one selected from a group consisting of LiTFSl (lithium bis(trifluoromethanesulfonyl)), $LiPF_6$, $LiBF_4$, $LiSbF_6$ and LiAsF.

In one embodiment, the lithium salt may be LiTFSl.

In the structure for the lithium secondary battery, the lithium salt may interact with an ether group (—O—) in a chain of the PEG of the compound to form a channel capable of delivering lithium ions.

The structure for the lithium secondary battery may control the lithium ionic conductivity of the structure by adjusting the ratio of a weight of the lithium salt to a weight of the structure. As the ratio of the weight of the lithium salt to the weight of the structure increases, the number of lithium ions that may be moved via the segmentation movement of the PEG chain increases, so that the lithium ionic conductivity may be improved.

In one implementation of the structure, the lithium salt has a content of 10 to 50 weight % based on a total weight of the structure. When the content of the lithium salt is smaller than about 10%, the introduction of the lithium salt has little influence on the activation of the segmental movement of the polyethylene glycol. When the content of the lithium salt is greater than about 50%, the excessive lithium salt interferes with the segmentation movement of the PEG chain, thereby reducing the effective number of transported lithium ions. Thus, the lithium ionic conductivity decreases. Thus, the lithium salt has a content of 10 to 50 weight % based on a total weight of the structure. In one implementation of the binder, the lithium salt has a content of 40 to 50 weight % based on a total weight of the structure.

In the membrane-electrode structure for the lithium secondary battery, when the electrolyte membrane and the binder have the same composition, the adhesion between the membrane and the electrode may be improved, and the interfacial resistance between the membrane and the electrode may be lowered.

In one embodiment, the interfacial resistance of the binder with the electrolyte membrane may be about 1800 to 2100Ω. Preferably, the interfacial resistance of the binder with the electrolyte membrane may be about 2000Ω.

According to the present disclosure, the electrolyte membrane having excellent mechanical strength and lithium ionic conductivity may be realized by containing a compound in which PEG is grafted to PAES or PAEK as a main chain or a block copolymer between PAES or PAEK and PEG, and the lithium salt, and thus having the lithium ion transfer channel formed therein. In this connection, the lithium ionic conductivity may be easily controlled by varying the weight % of the lithium salt. Further, when the binder has the same composition as the electrolyte membrane, the lithium ions may be easily brought into a conductive state, compared to a case when the conventional PVDF binder is used. Furthermore, when the binder has the same composition as the electrolyte membrane, a high adhesive force between the electrolyte membrane and the electrode and a low interfacial resistance between the electrolyte membrane and the electrode may be achieved.

Further, the compound represented by one of the Chemical Formulas 1 to 4 according to the present disclosure is excellent in the adhesion effect with the aluminum foil, and thus allows a simple constructed all-solid-state battery with improved battery performance and stability to be manufactured in a simple manner.

Example 1: Compound

Compound Preparation

FIG. 1 shows the compounds according to the present disclosure.

Referring to FIG. 1, the compound may have a structure in which polyethylene glycol (hereinafter referred to as PEG) binds to a poly(arylene ether sulfone) (hereinafter referred to as PAES) or poly(arylene ether ketone) (hereinafter referred to as PAEK) as a main chain.

Specifically, 4,4-bis(4-hydroxyphenyl) valeric acid (95%) and bis(4-fluorophenyl)sulfone (99%) were used to synthesize PAES-COOH as a main chain of the copolymer based on the PAES. Further, 4,4-bis(4-hydroxyphenyl) valeric acid (95%) and 4,4'-difluorobenzophenone (DBP) were used to synthesize PAEK-COOH as a main chain of the copolymer based on the PAEK. Each of PAES-g-PEG and PAEK-g-PEG copolymers was synthesized by grafting polyethylene glycol monoethyl ether (PEG) to each of the synthesized PAES-COOH and PAEK-COOH. The synthesized PAES-g-PEG and PAEK-g-PEG copolymers have structures represented by (a) and (b) in FIG. 1, respectively.

In addition to the PAES-g-PEG and PAEK-g-PEG copolymers, a block copolymer between PAES and PEG and a block copolymer between PAEK and PEG were produced such that the phase separation may be made clearly within the polymer structure. The produced PAES-b-PEG and PAEK-b-PEG block copolymers have structures represented by (c) and (d) in FIG. 1, respectively.

Experimental Example A: Compound Synthesis Evaluation

Figure 2A:
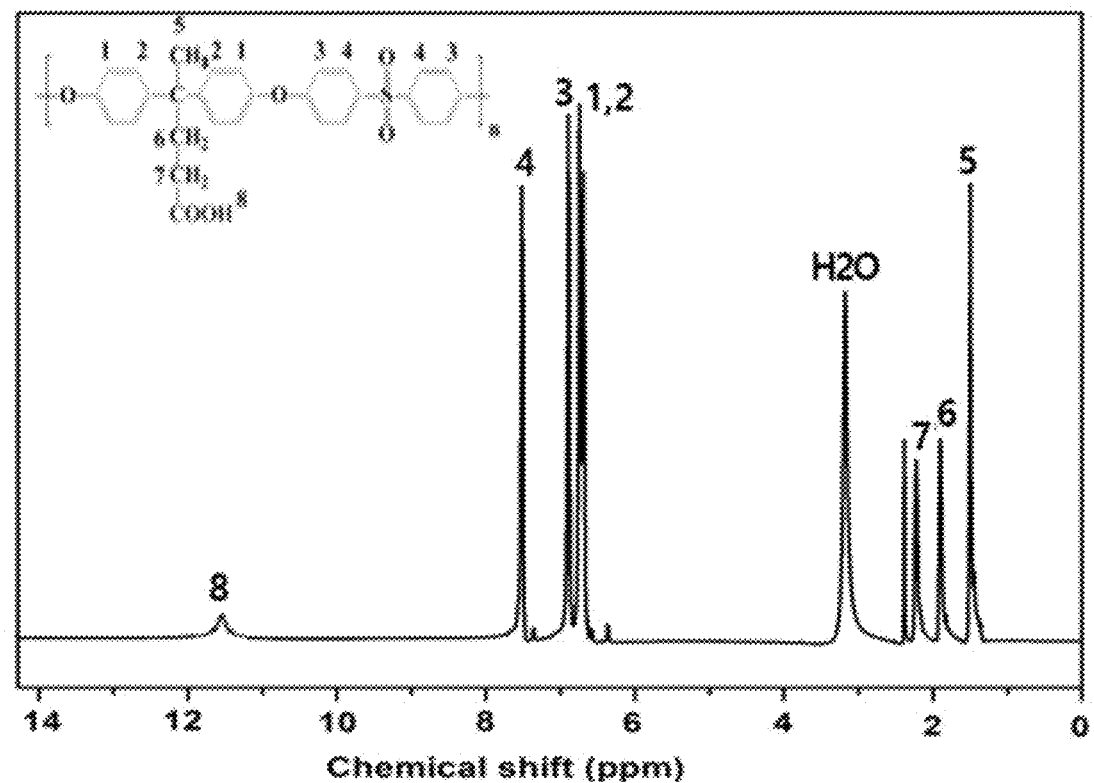
FIG. 2A-2C shows a result of compound synthesis evaluation of Experimental Example A according to the present disclosure.
Figure 2B:
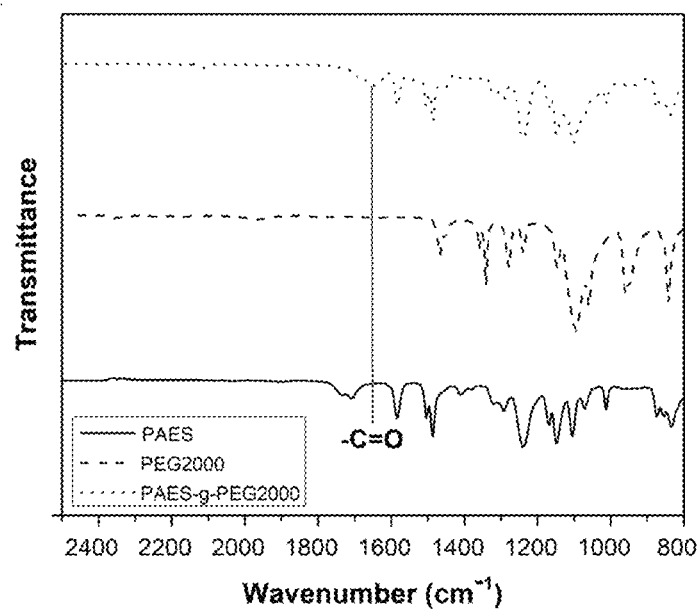
Figure 2C:
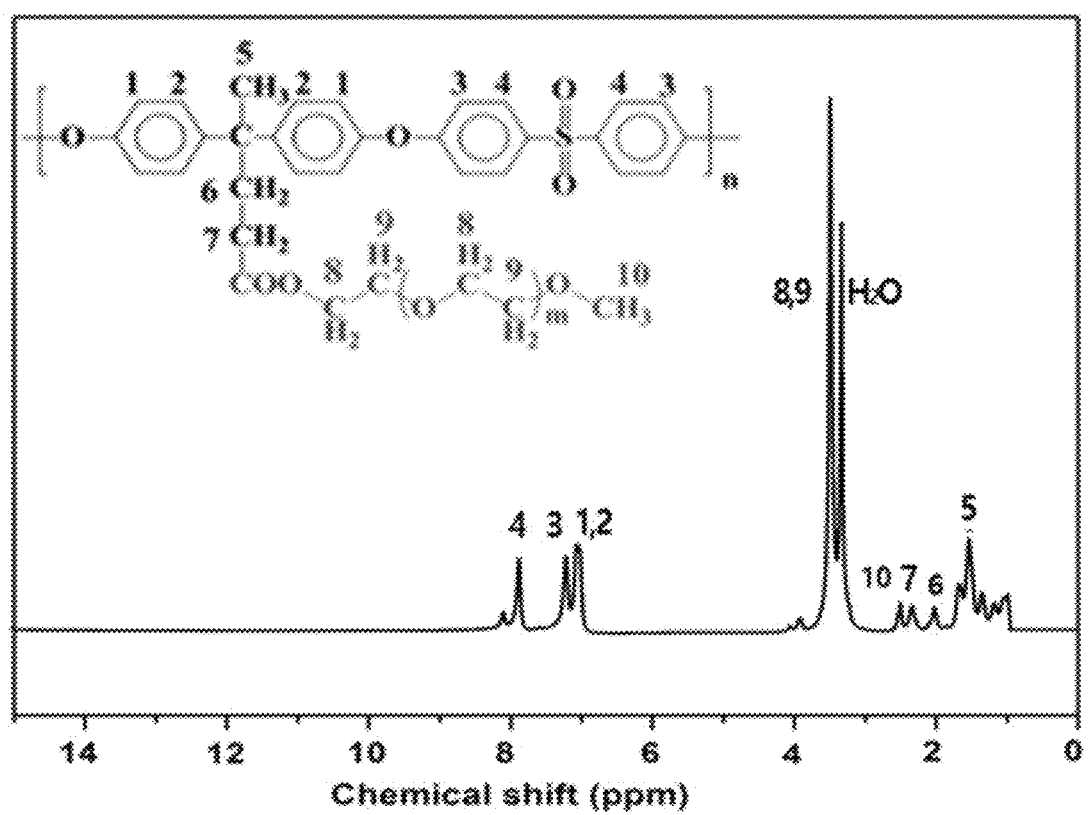

To identify the synthesis of the PAES-g-PEG manufactured in Example 1 of the present disclosure, each of the PAES-COOH and the produced PAES-g-PEG was subjected to nuclear magnetic resonance analysis (1H-NMR) and Fourier transform infrared spectroscopy (FT-IR). The results are shown in FIG. 2A-2C. FIG. 2A-2C show results of compound synthesis evaluation of Experimental Example A according to the present disclosure. FIGS. 2A and 2B are diagrams showing 1H-NMR spectra of PAES-COOH and PAES-g-PEG, respectively. FIG. 2C is a diagram showing a PAES-g-PEG FT-IR spectrum.

Referring to FIG. 2A, synthesis of the PAES-COOH main chain may be identified. In FIG. 2B, the synthesis of the PAES-g-PEG copolymer in which the PEG chain is grafted to a side chain of the PAES may be identified. Further, In FIG. 2C, the PAES-g-PEG copolymer synthesis may be identified.

Example 2: Electrolyte Membrane

Electrolyte Membrane Manufacturing

The electrolyte membrane was manufactured using lithium bis(trifluoromethanesulfonyl) (LiTFSI) as the lithium salt. After the PAES-g-PEG produced in the Example 1 and the LiTFSI were dissolved in tetrahydrofuran (THF) to form a mixed solution, the mixed solution was cast and dried on a glass plate. Thus, a solid electrolyte membrane was manufactured. In this connection, adjusting the weight % of the LiTFSI allowed the solid electrolyte membranes having various contents of LiTFSI to be manufactured.

Figure 3:
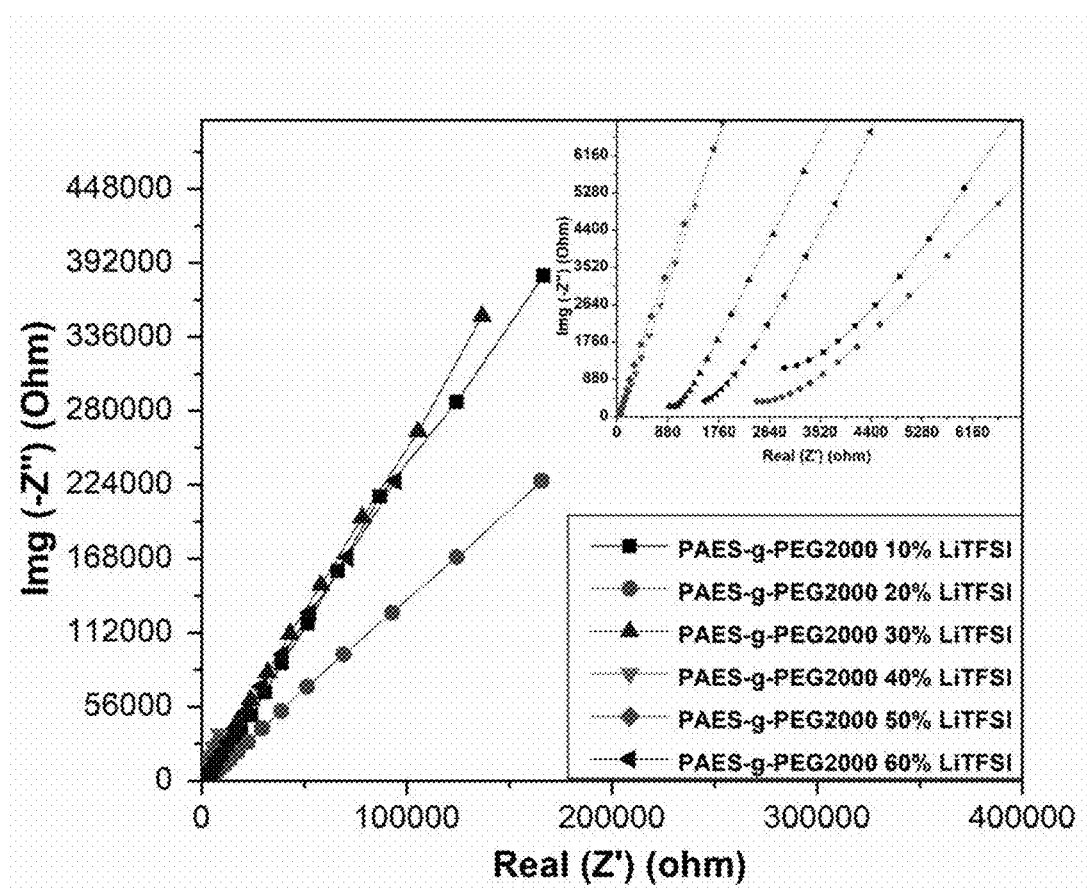
FIG. 3 and FIG. 4 are diagrams showing results of evaluating electrical properties of an electrolyte membrane according to the present disclosure in Experimental Example B of the present disclosure, and showing Nyquist plots and lithium ionic conductivity graphs of a PAES-g-PEG solid electrolyte membrane containing various concentrations of a LiTFSl salt.
Figure 4:
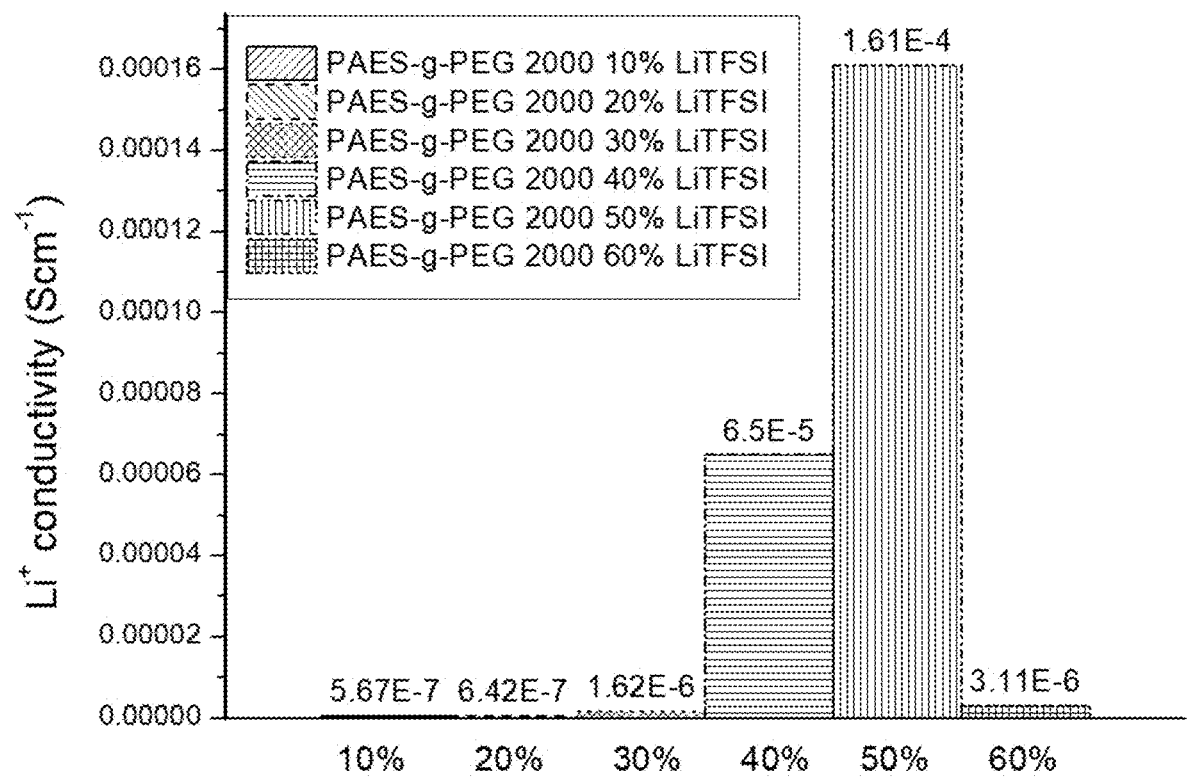

Experimental Example B: Evaluation of Electrical Properties of Electrolyte Membrane According to the Present Disclosure The electrical properties of the solid electrolyte membrane manufactured in Example 2 according to the present disclosure were evaluated based on the Nyquist plot and the lithium ionic conductivity graph. The graph is shown in each of FIG. 3 and FIG. 4. FIG. 3 and FIG. 4 are diagrams showing results of evaluating electrical properties of an electrolyte membrane according to the present disclosure in Experimental Example B of the present disclosure, and showing Nyquist plots and lithium ionic conductivity graphs of a PAES-g-PEG solid electrolyte membrane containing various concentrations of a LiTFSI salt.

Referring to FIG. 3 and FIG. 4, it may be seen that the lithium ionic conductivity is improved as the weight % of LiTFSI is increased from 10% to 50%. It may be seen that the lithium ionic conductivity is reduced as the weight % of LiTFSI is 60% or greater. This may indicate that the lithium ionic conductivity may be improved by increasing the number of lithium ions that may be moved via the segmentation movement of the PEG chain as the weight % of LiTFSI increases. However, when the weight % of LiTFSI exceeds 60%, the excessive LiTFSl interferes with the segmentation movement of the PEG chain, thereby reducing the number of effective transported lithium ions, such that the lithium ionic conductivity decreases.

Example 3: Electrode Containing Therein Binder According to the Present Disclosure Manufacturing of Positive-Electrode Containing Therein Binder
(1) $LiCoO_2$ Based Positive-Electrode
Binders having various weight % of LiTFSl were manufactured by performing the same procedure as in Example 2. After dissolving 80% of the positive-electrode active material $LiCoO_2$, 10% of carbon black, and 10% of binders having various weight % of LiTFSl in N-methyl-2-pyrrolidone (NMP) to form a mixed solution, the mixed solution was cast on aluminum foil, thereby to form a positive-electrode.
(2) $LiNiMnCoO_2$ Based Positive-Electrode
Binders having various weight % of LiTFSl were manufactured by performing the same procedure as in Example 2. After dissolving 80% of the positive-electrode active material $LiNiMnCoO_2$, 10% of carbon black, and 10% of binders having various weight % of LiTFSl in N-methyl-2-pyrrolidone (NMP) to form a mixed solution, the mixed solution was cast on aluminum foil, thereby to form a positive-electrode.

Figure 5A:
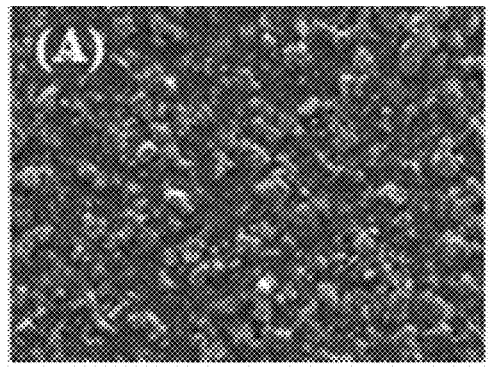
FIG. 5A-5F shows a result of surface and cross-section analysis of a positive-electrode containing therein a binder according to the present disclosure in Experimental Example C according to the present disclosure.
Figure 5B:
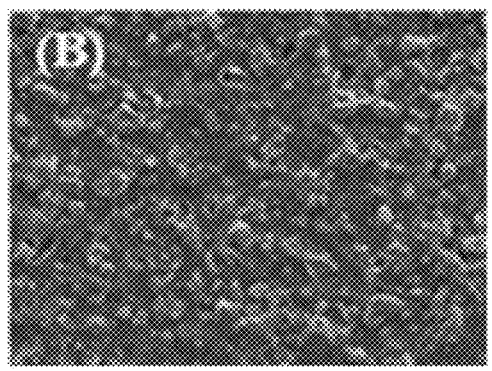
Figure 5C:
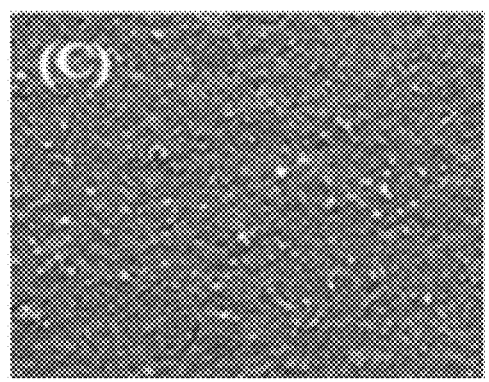
Figure 5D:
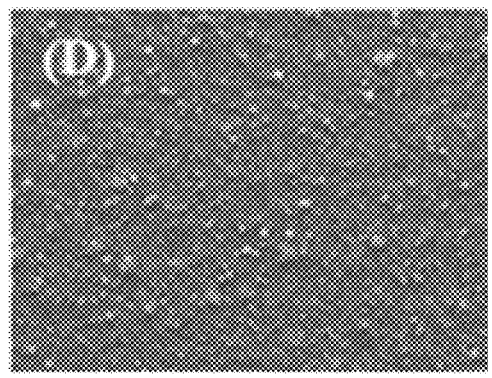
Figure 5E:
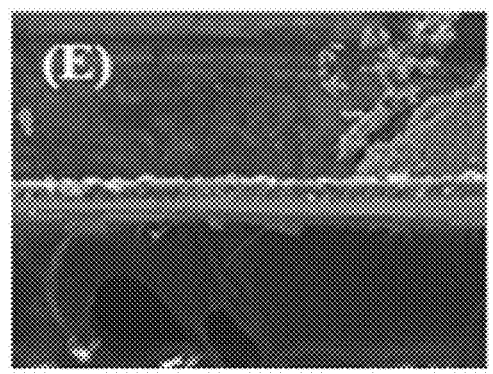
Figure 5F:
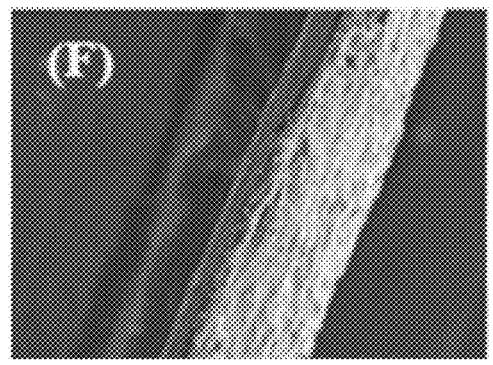

Experimental Example C: Surface and Cross-Section Analysis of Positive-Electrode Containing Therein Binder in Accordance with the Present Disclosure Surface and cross-section analysis of each positive-electrode containing therein the binder as manufactured according to Example 3 of the present disclosure was performed. In a comparative example, a positive-electrode containing therein PVDF as a conventional binder for a lithium secondary battery was used. The surface and cross-section images of each positive-electrode were obtained using a scanning electron microscope (SEM). The results are shown in FIG. 5A-5F. FIG. 5A-5F show results of surface and cross-section analysis of a positive-electrode containing therein a binder according to the present disclosure in Experimental Example C according to the present disclosure. FIG. 5A-5D show a positive-electrode surface SEM image, and FIGS. 5E and 5F are a positive-electrode cross-sectional SEM image. Specifically, FIG. 5A is directed to a $LiCoO_2$/PVDF binder, FIG. 5B is directed to a $LiCoO_2$/PAES-g-PEG binder, FIG. 5C is directed to a $LiNiMnCoO_2$/PVDF binder, and FIG. 5D is directed to a $LiNiMnCoO_2$/PAES-g-PEG binder. FIG. 5E is directed to a $LiCoO_2$/PAES-g-PEG binder and FIG. 5F is directed to a $LiNiMnCoO_2$/PAES-g-PEG binder.

Referring to FIG. 5A-5F, it may be identified that when using the PAES-g-PEG binder, the active material, the carbon black, and the PAES-g-PEG binder in the positive-electrode are uniformly distributed without forming coarse aggregates. Thus, it may be expected that the PAES-g-PEG binder has excellent compatibility with the active material. Further, the same effect may be identified in FIGS. 5E and 5F.

Figure 6A:
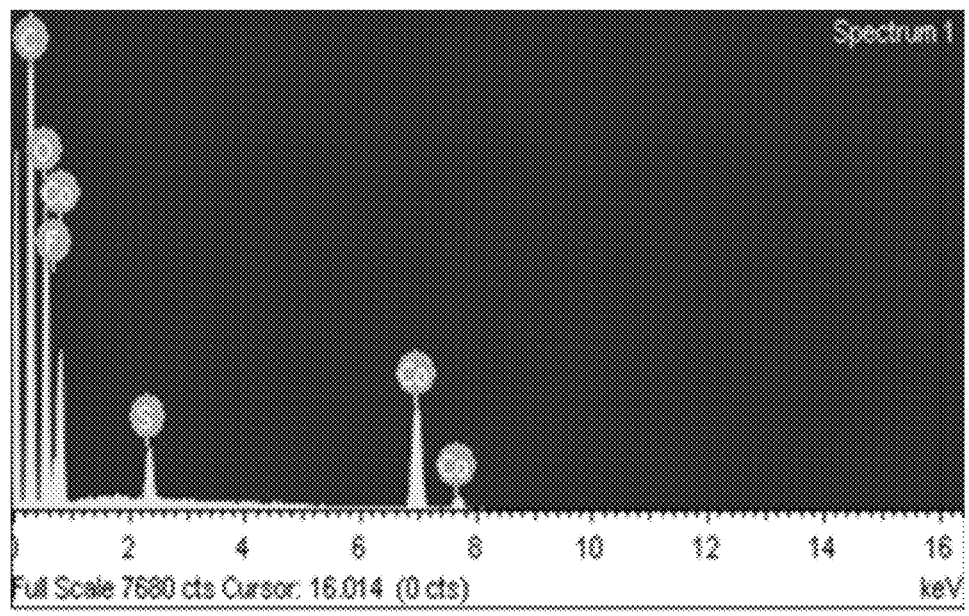
FIGS. 6A and 6B are EDS measurement diagrams showing results of elemental analysis evaluation of a positive-electrode material in which a binder according to the present disclosure of Experimental Example D according to the present disclosure is contained.
Figure 6B:
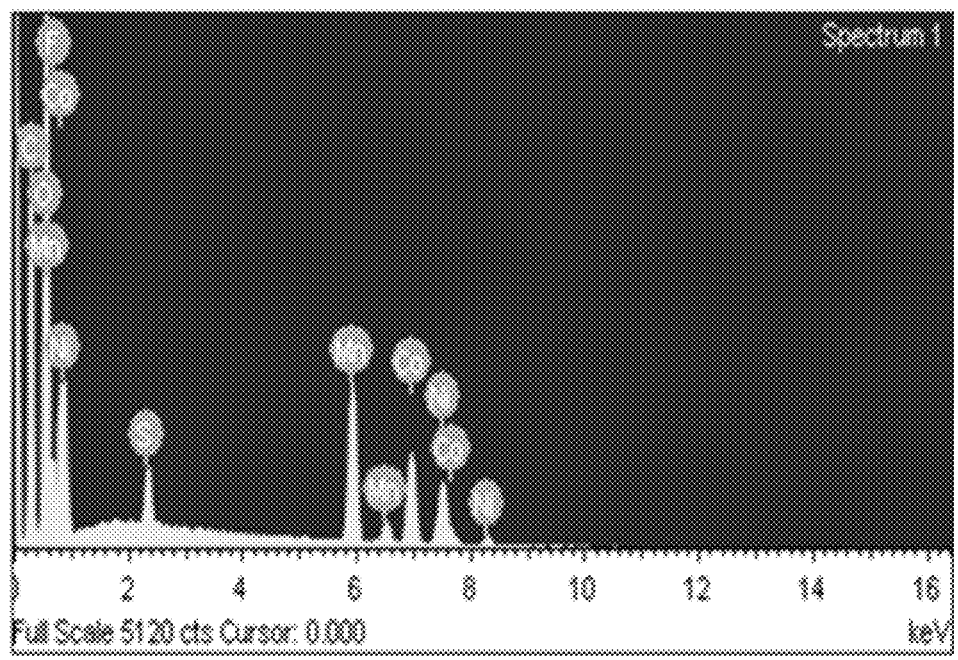

Experimental Example D: Elemental Analysis of Positive-Electrode Material Containing Therein Binder According to the Present Disclosure Elemental analysis of each positive-electrode containing therein the binder as manufactured according to Example 3 of the present disclosure was performed using Energy Dispersive Spectrometry (EDS). The results are shown in FIG. 6A-6B. FIG. 6A-6B are EDS measurement diagrams showing results of elemental analysis evaluation of a positive-electrode material in which a binder according to the present disclosure of Experimental Example D according to the present disclosure is contained. FIG. 6A is directed to a $LiCoO_2$/PAES-g-PEG binder, and FIG. 6B is directed to a $LiNiMnCoO_2$/PAES-g-PEG binder.

Referring to FIGS. 6A and 6B, it may be identified based on S, O element peaks, that the sulfone group of PAES-g-PEG is present in the positive-electrode material. Thus, it may be expected that the PAES-g-PEG binder is attached to each positive-electrode material.

Figure 7:
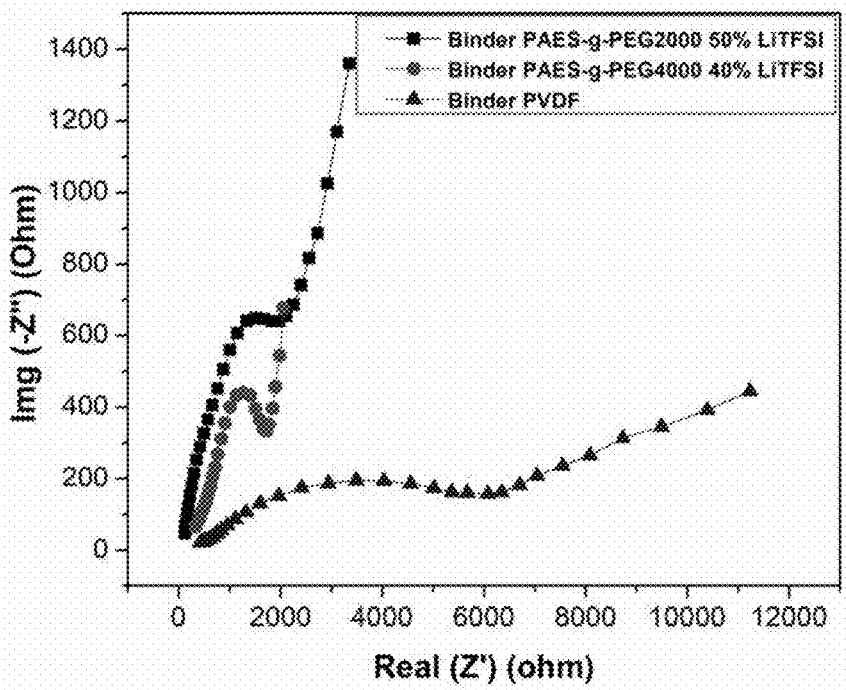
FIG. 7 is a Nyquist plot showing a result of analysis of an interfacial resistance of a binder according to the present disclosure with an electrolyte membrane according to the present disclosure of Experimental Example E according to the present disclosure.

Experimental Example E: Analysis of Interfacial Resistance of Binder According to the Present Disclosure with Electrolyte Membrane According to the Present Disclosure The interfacial resistance of the PAES-g-PEG binder with the PAES-g-PEG electrolyte membrane as manufactured according to Example 2 of the present disclosure, and the interfacial resistance of the PVDF binder as a comparative example with the PAES-g-PEG electrolyte membrane were analyzed based on the Nyquist diagram. The results are shown in FIG. 7. FIG. 7 is a Nyquist plot showing a result of analysis of an interfacial resistance of a binder according to the present disclosure with an electrolyte membrane according to the present disclosure of Experimental Example E according to the present disclosure. FIG. 7 shows an interfacial resistance of each of a PAES-g-PEG binder and a PVDF binder with a PAES-g-PEG solid electrolyte membrane.

Referring to FIG. 7, it may be seen that the interfacial resistance of the PAES-g-PEG binder with the PAES-g-PEG solid electrolyte membrane is 20000, while the interfacial resistance of the PVDF binder therewith is 60000. Thus, the membrane-electrode structure including the electrolyte membrane manufactured using PAES-g-PEG copolymer and the binder for the positive-electrode manufactured using the same composition as the electrolyte membrane has the improved lithium ion transport ability between the electrolyte membrane and the positive-electrode surface, and thus has lower interfacial resistance than that in the prior art (Comparative Example).

Figure 8:
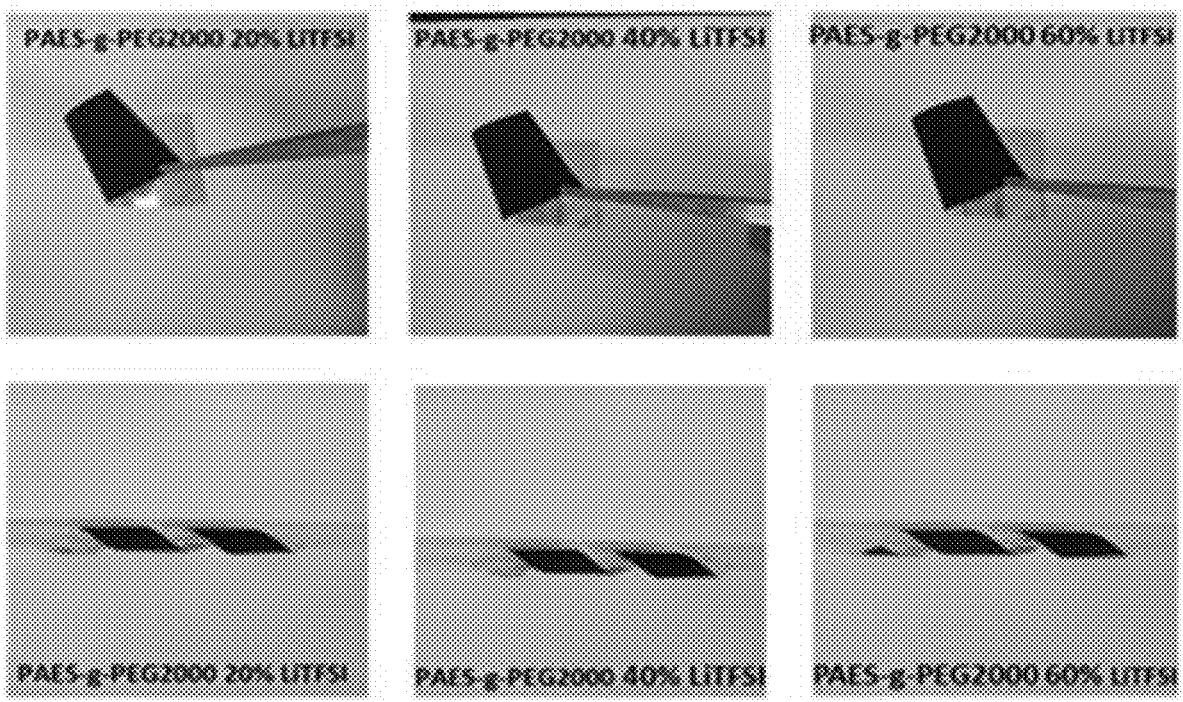
FIG. 8 is a diagram showing a result of flexibility evaluation of a positive-electrode containing a binder according to the present disclosure of Experimental Example F according to the present disclosure therein.

Experimental Example F: Evaluating Flexibility of Positive-Electrode Containing Therein Binder According to the Present Disclosure Flexibility evaluation of the positive-electrode manufactured using the PAES-g-PEG binders having various concentrations of LiTFSl was performed. The flexibility evaluation was performed by observing, with a naked eye, the appearance of the positive-electrode when the electrode was folded in half or wound around a glass rod. FIG. 8 shows the results. FIG. 8 is a diagram showing a result of flexibility evaluation of a positive-electrode containing a binder according to the present disclosure of Experimental Example F according to the present disclosure therein.

Referring to FIG. 8, it may be identified that no mechanical defect occurs when the positive-electrode is folded in half, or wound around the glass rod. Thus, it may be seen that the positive-electrode manufactured using the binder according to the present disclosure has excellent flexibility and mechanical strength.

Figure 9A:
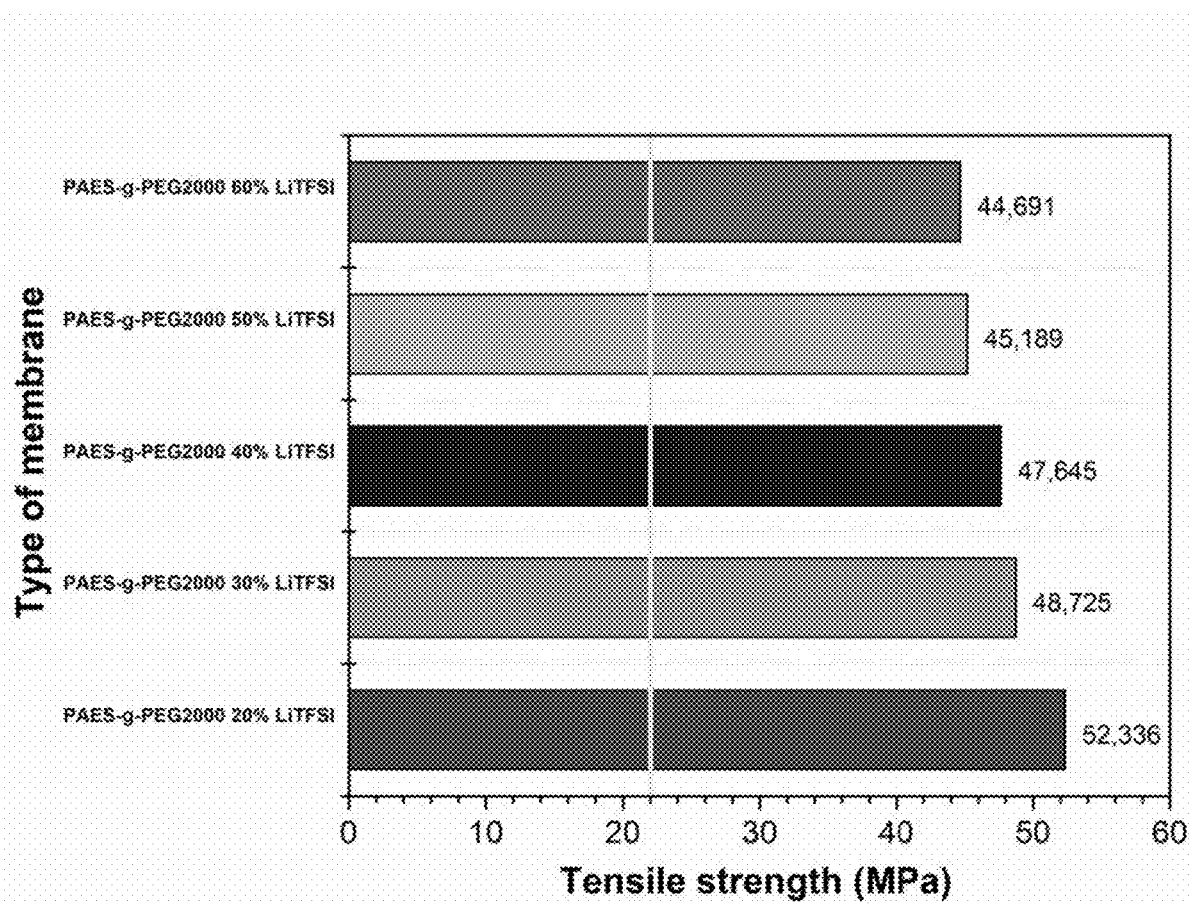
FIG. 9A-9D is a diagram showing an evaluation result of adhesion of a positive-electrode containing therein a binder according to the present disclosure of Experimental Example G according to the present disclosure.
Figure 9B:
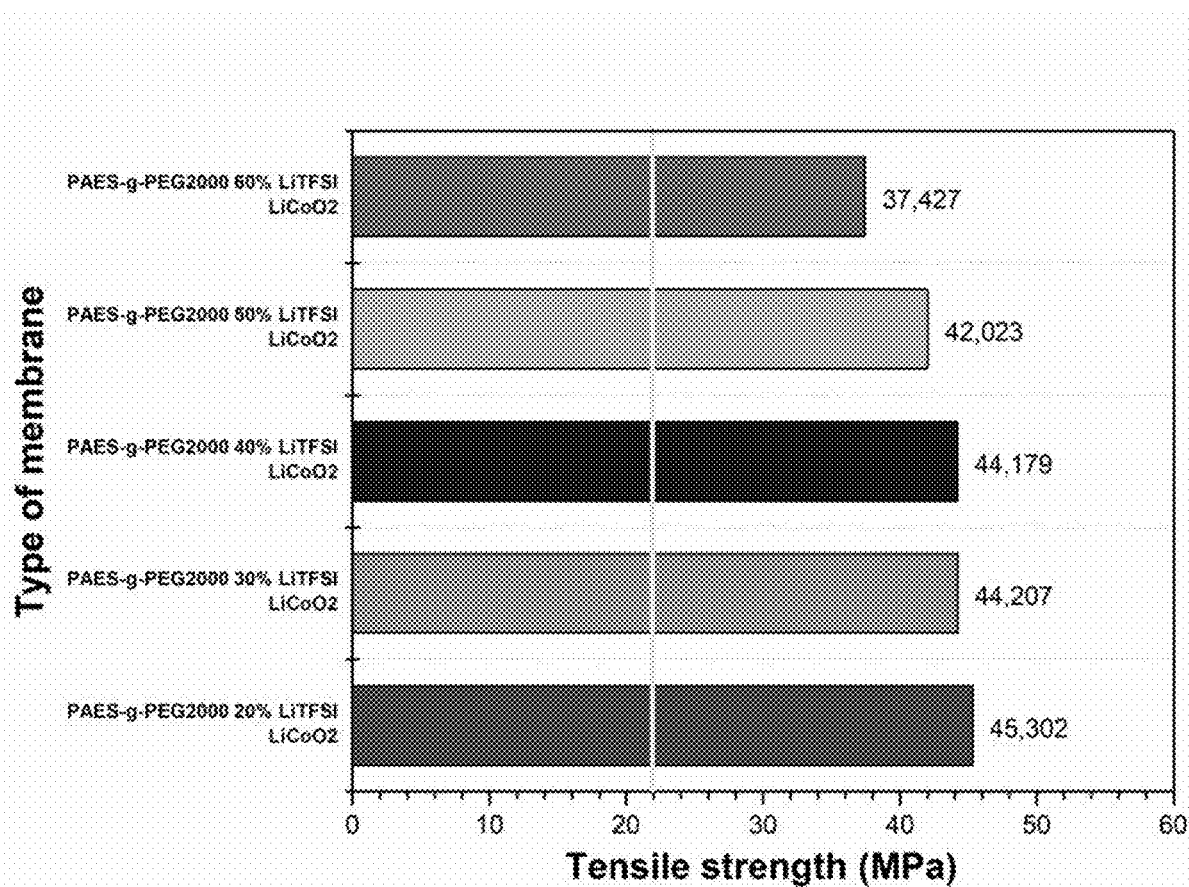
Figure 9C:
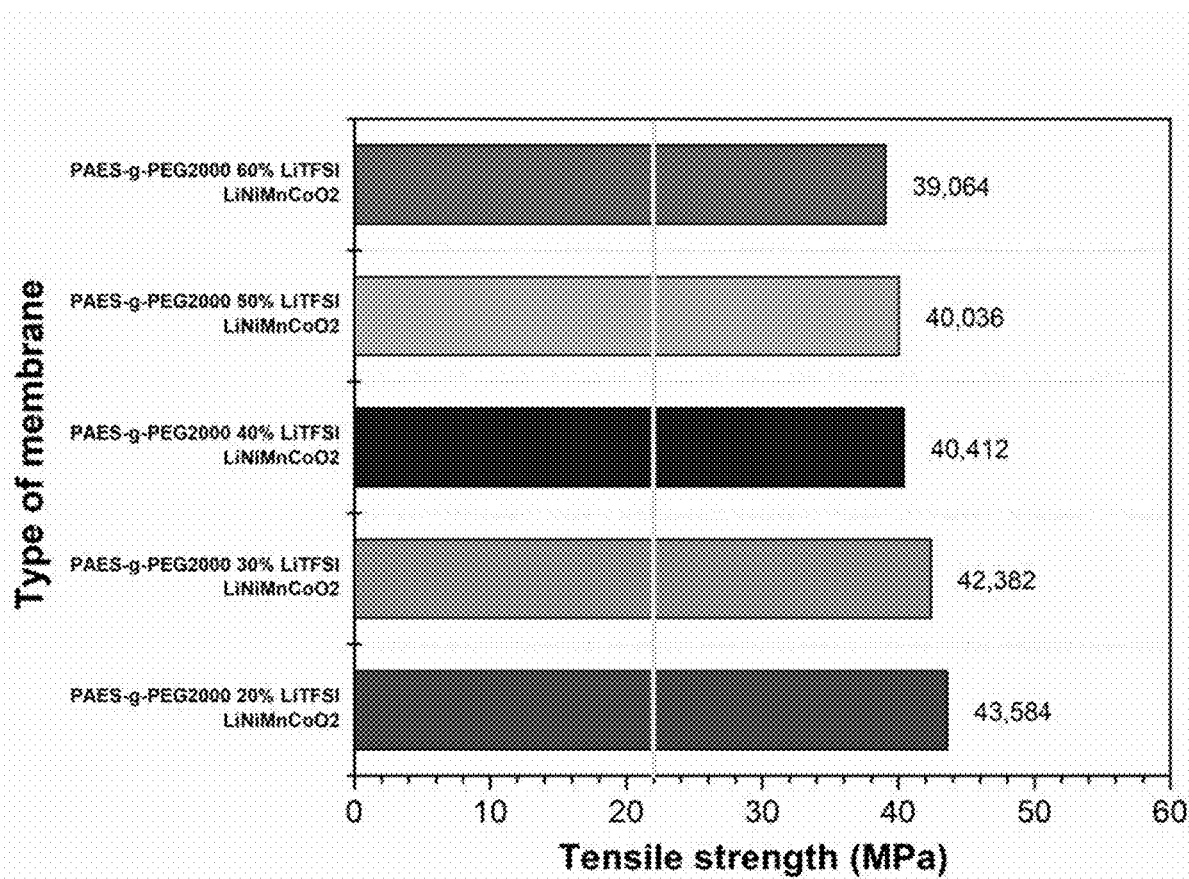
Figure 9D:
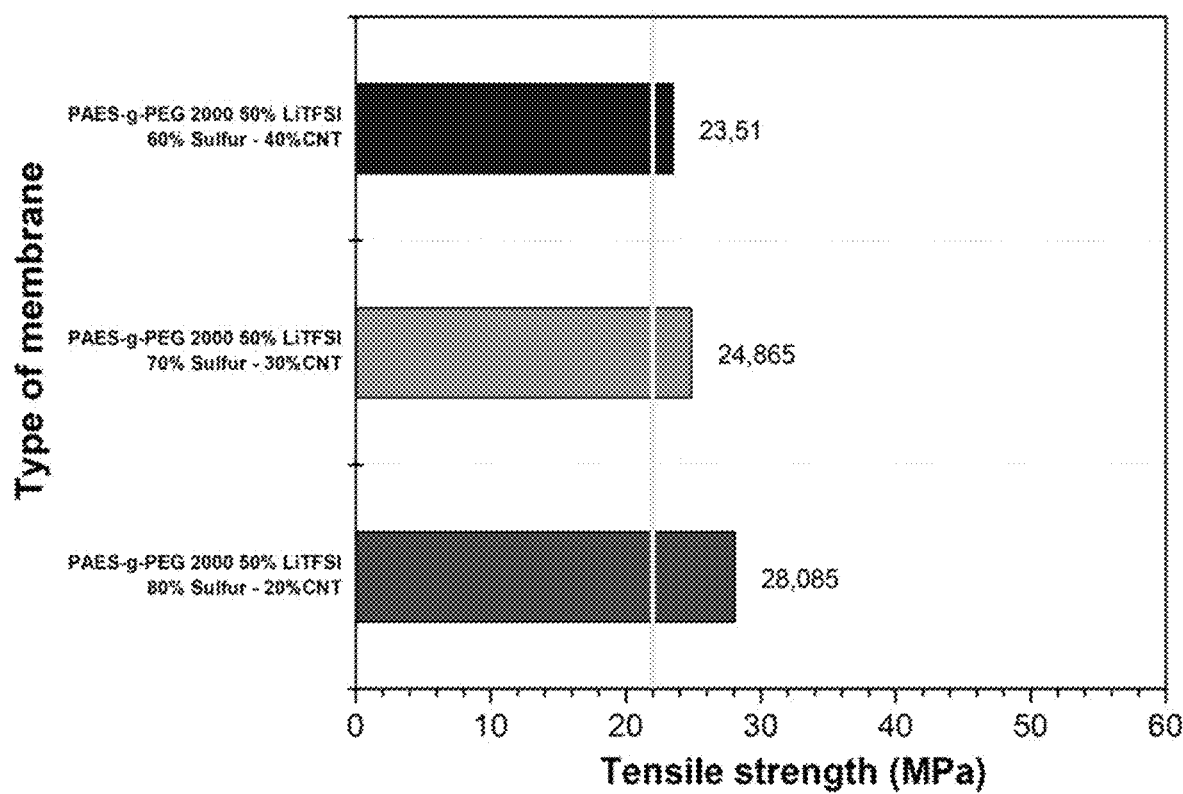
Figure 10A:
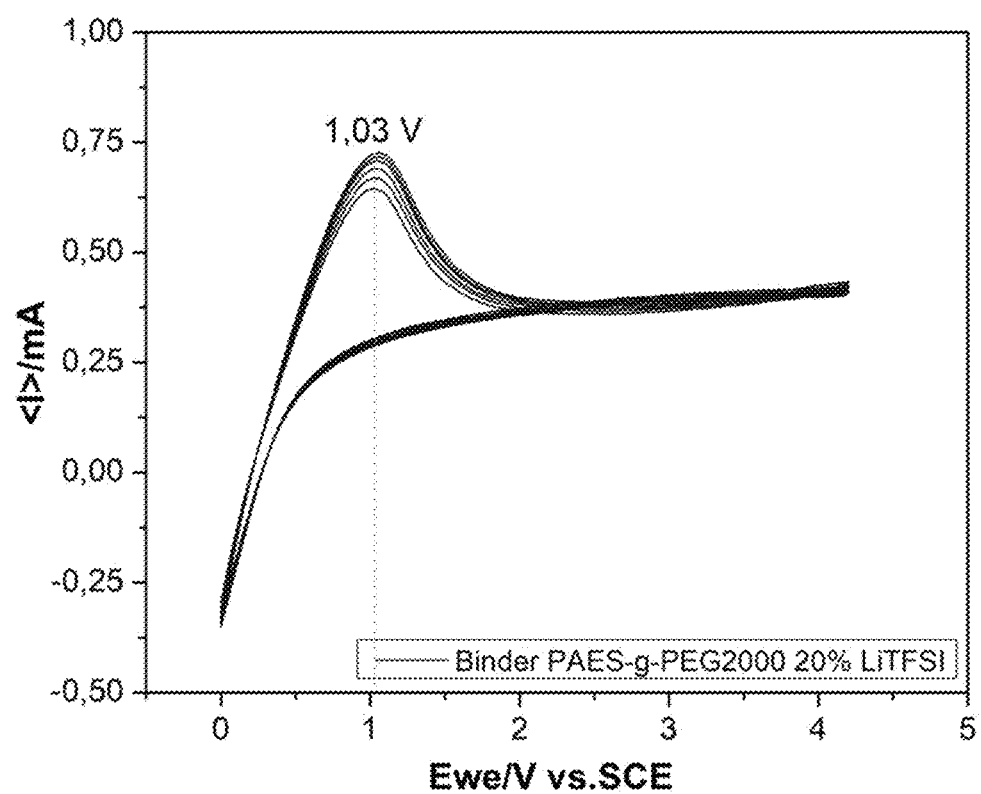
Figure 10B:
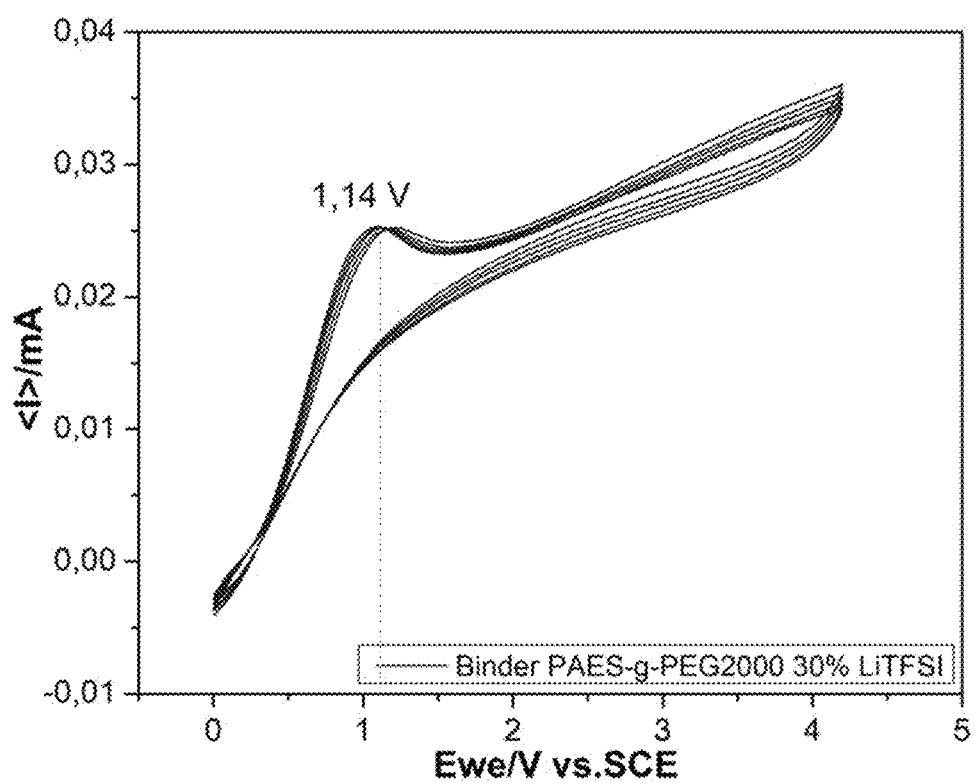
Figure 10C:
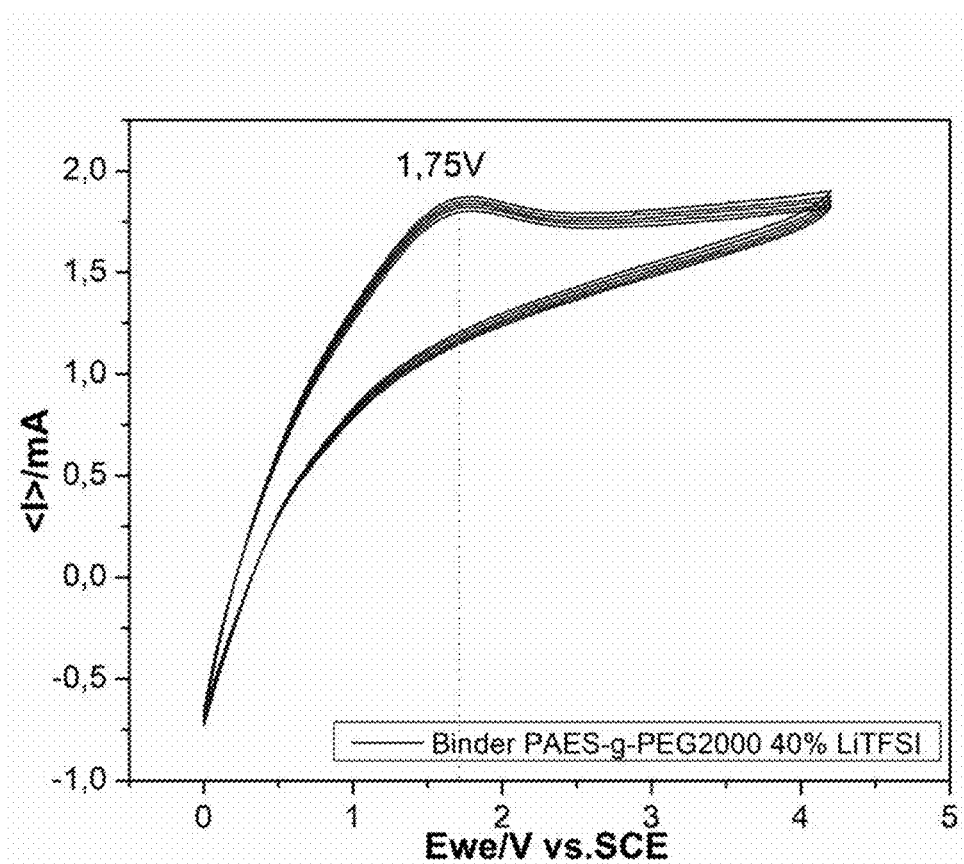
Figure 10D:
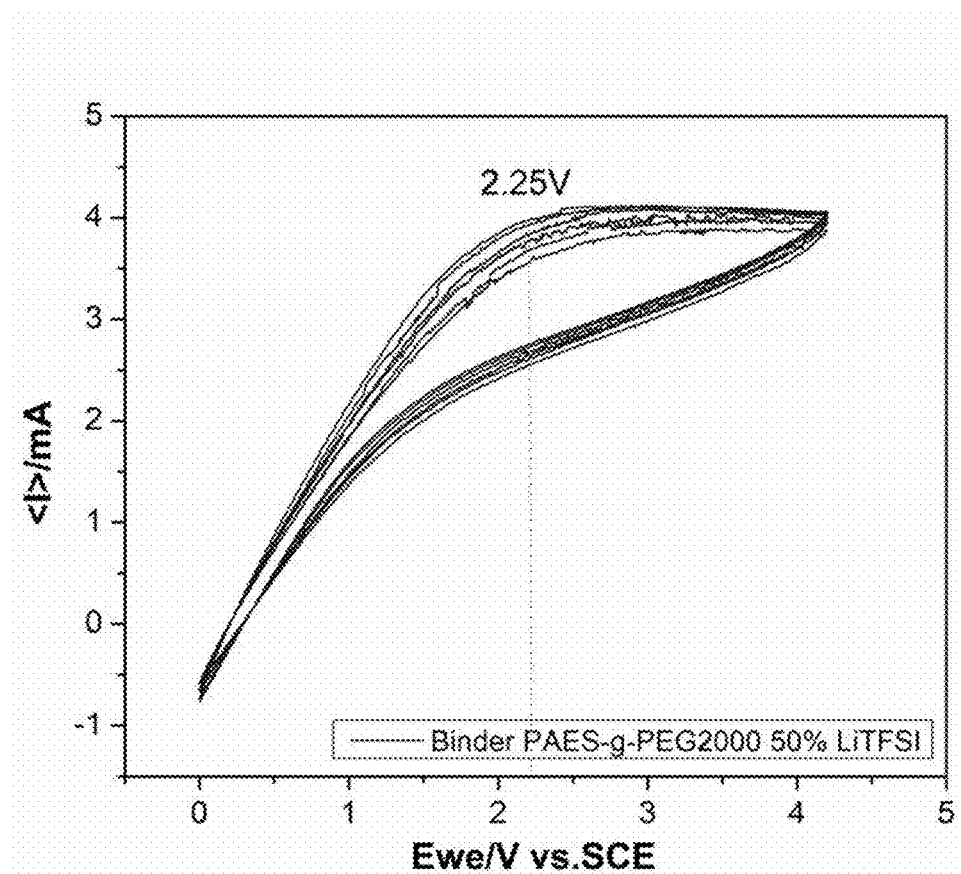
Figure 10E:
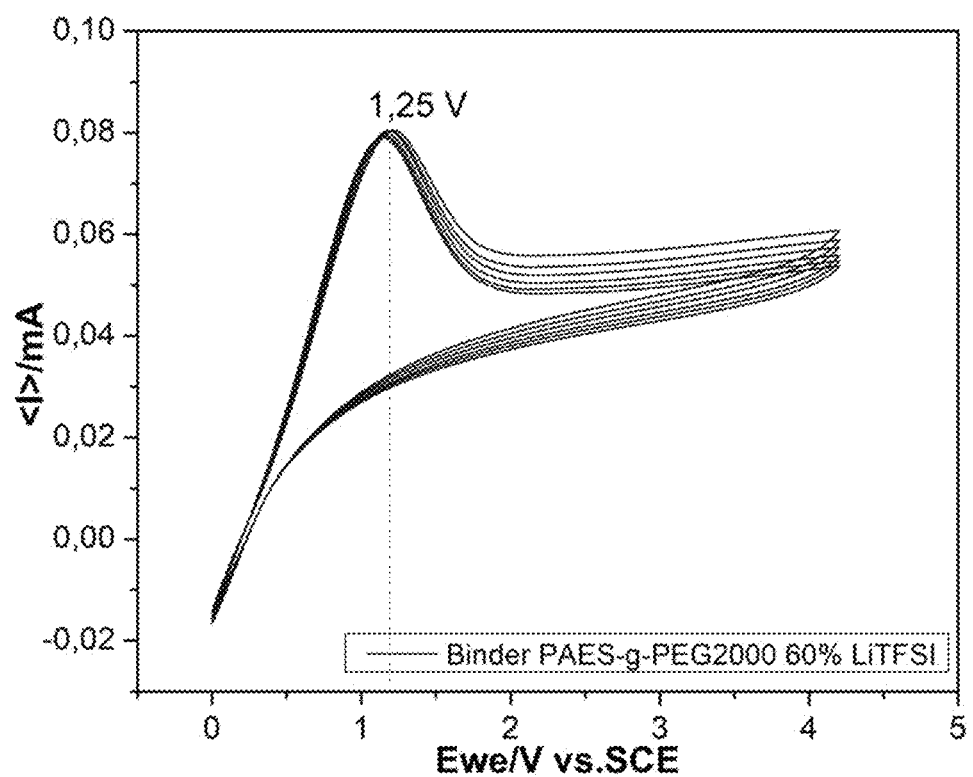
Figure 11A:
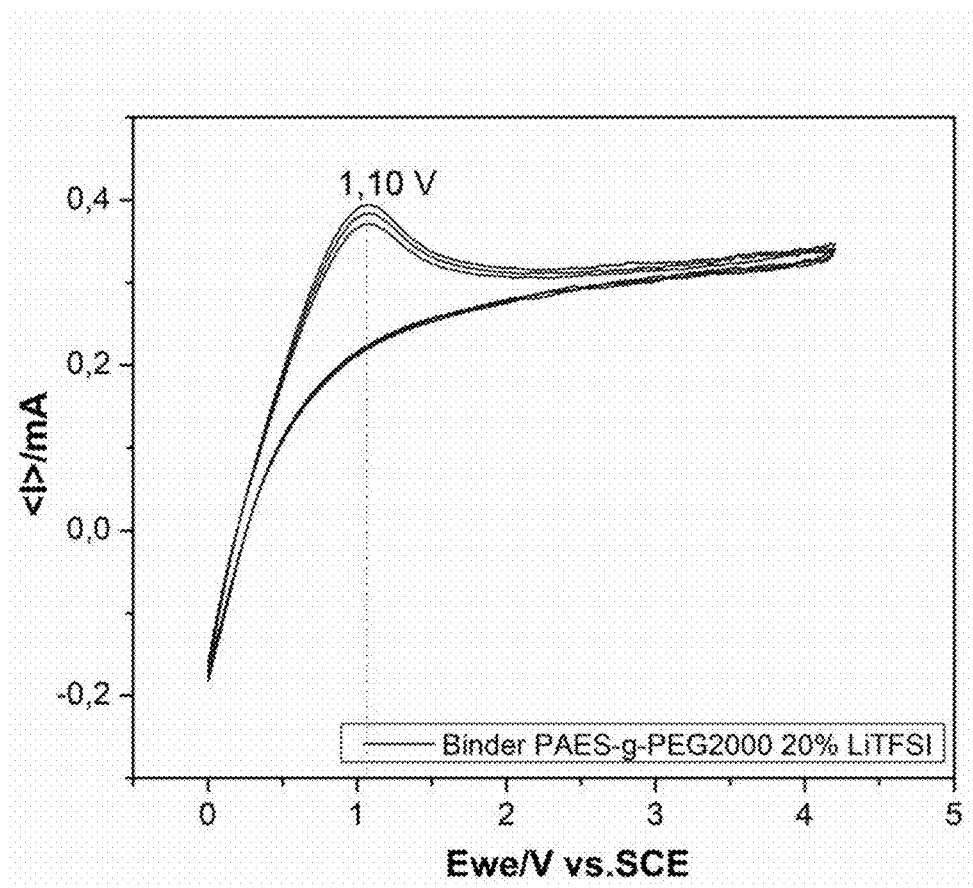
FIG. 11A-11E is a voltage-current graph of a positive-electrode using LiNiMnCoO$_2$ and a PAES-g-PEG binder containing a LiTFSl salt of each of various concentrations in an all-solid-state battery system.
Figure 11B:
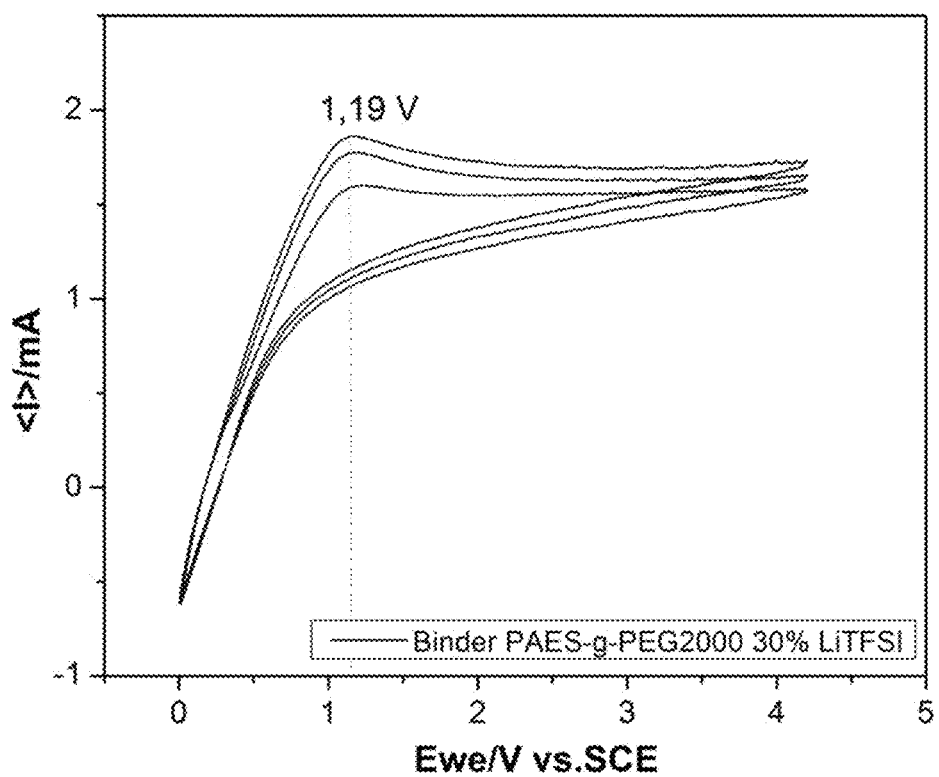
Figure 11C:
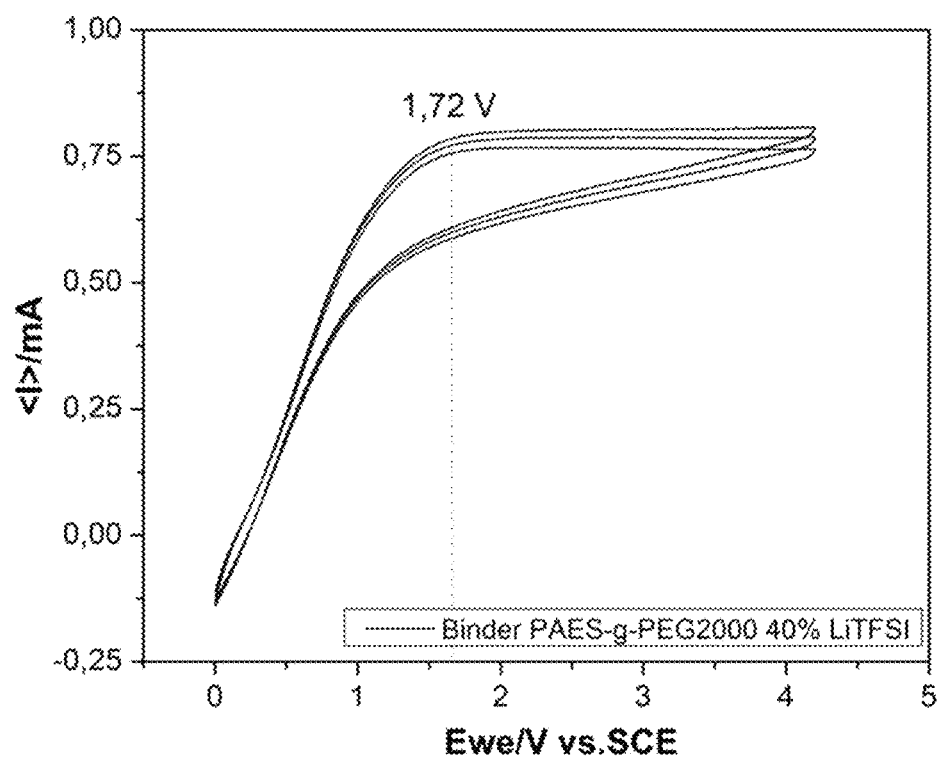
Figure 11D:
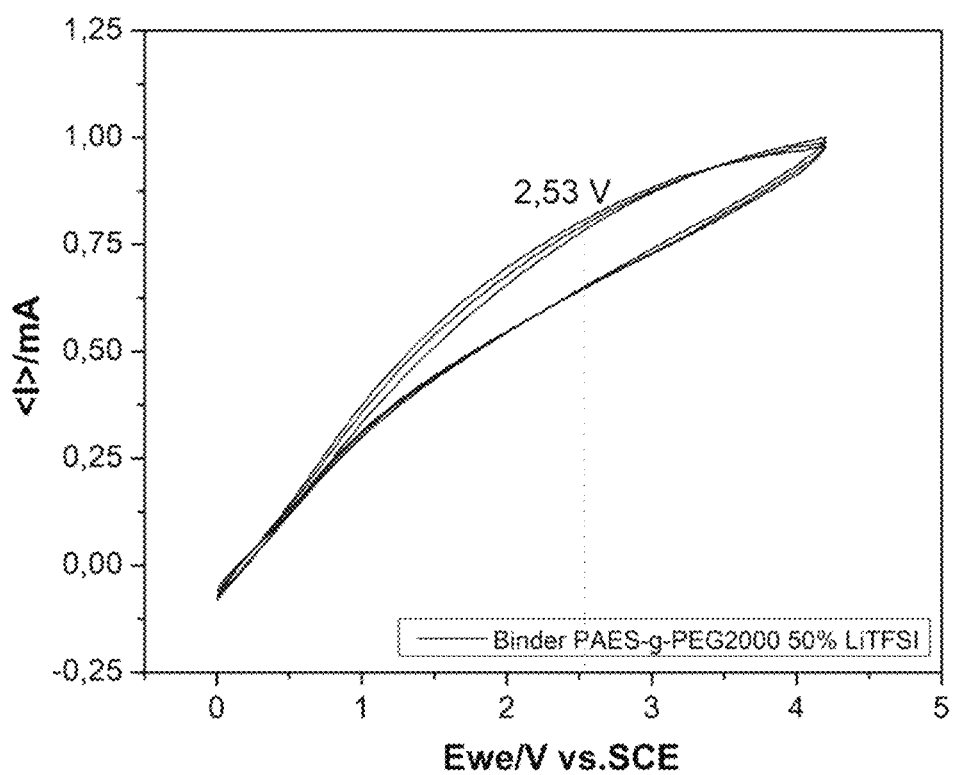
Figure 11E:
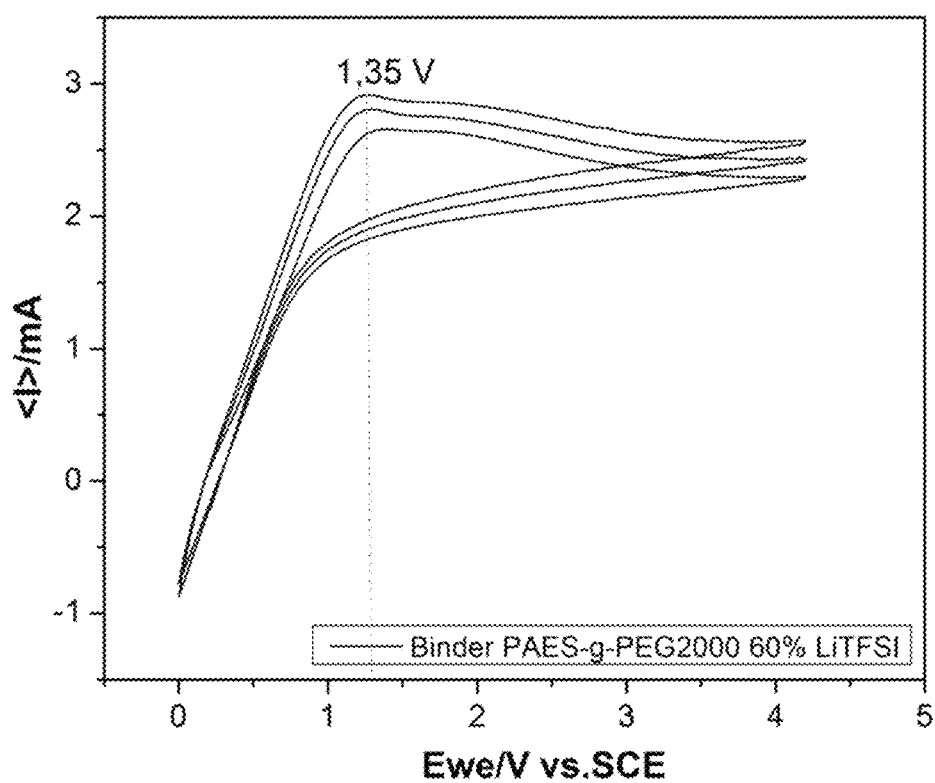

Experimental Example G: Evaluation of Adhesion of Positive-Electrode Containing Therein Binder According to the Present Disclosure FIG. 9A-9D are diagrams showing an evaluation result of adhesion of a positive-electrode containing therein a binder according to the present disclosure of Experimental Example G according to the present disclosure. FIG. 9A shows adhesion of a PAES-g-PEG binder with an aluminum foil, FIG. 9B shows adhesion of a PAES-g-PEG binder to a positive-electrode using $LiCoO_2$, FIG. 9C shows adhesion of a PAES-g-PEG binder to a positive-electrode using LiNiMnCoO$_2$, and FIG. 9D shows adhesion of a PAES-g-PEG binder to a positive-electrode using sulfur/CNT.

Referring to FIG. 9A-9D, it may be identified that the adhesion FIG. 9A of the PAES-g-PEG binder with the aluminum foil, the adhesion FIG. 9B of the PAES-g-PEG binder to the positive-electrode using $LiCoO_2$, the adhesion FIG. 9C of the PAES-g-PEG binder to the positive-electrode using LiNiMnCoO$_2$, and the adhesion FIG. 9D of the PAES-g-PEG binder to the positive-electrode using sulfur/CNT are higher than a reference value (indicated by a yellow line on each graph).

Experimental Example H: Evaluation of Suitability of PAES-g-PEG Binder for PAES-g-PEG Electrolyte Membrane in Accordance with the Present Disclosure In an all-solid lithium ion battery system including the electrolyte membrane according to the present disclosure and the binder having the same composition as the electrolyte membrane, the compatibility between PAES-g-PEG binders containing various concentrations of the LiTFSI salt and the positive-electrode made of the active materials $LiCoO_2$, LiNiMnCoO$_2$, Sulfur/CNT, a charging and discharging cycle thereof was measured using a voltammetry method. The results are shown in FIG. 10A to FIG. 12C.

Figure 12A:
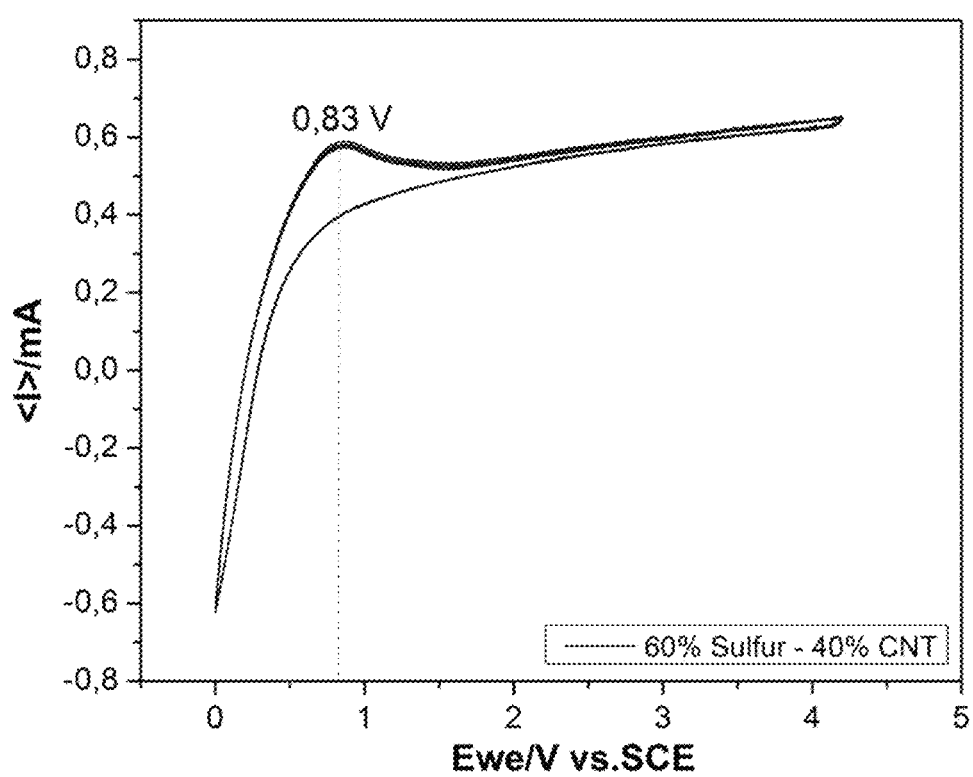
Figure 12B:
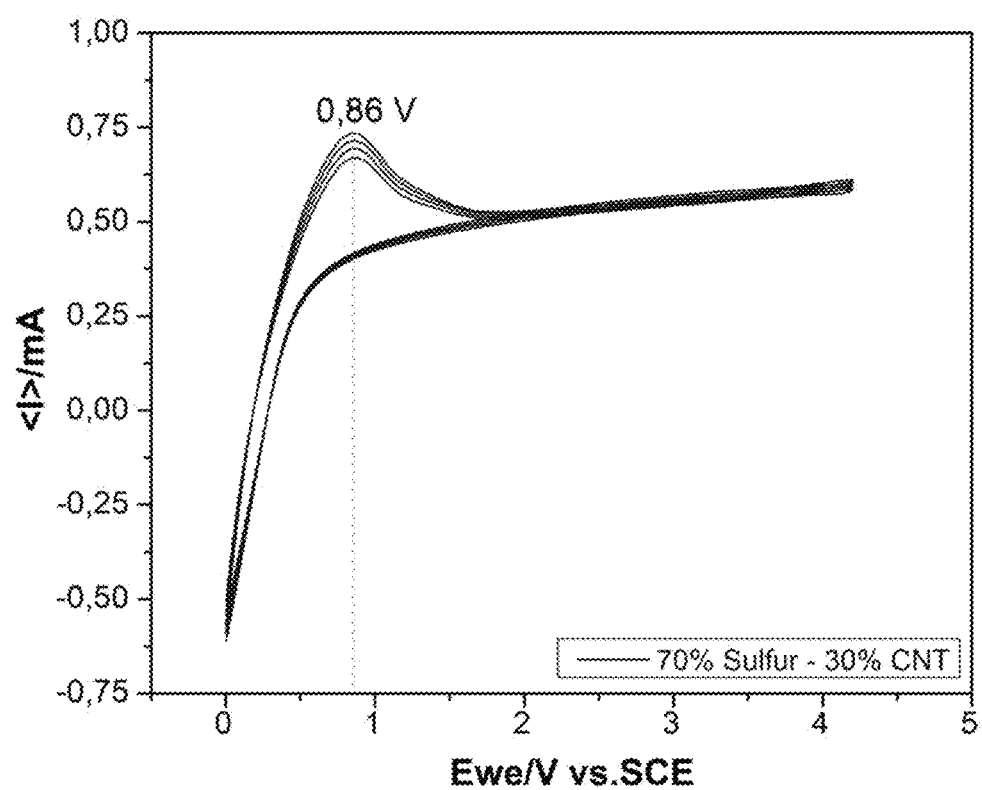
Figure 12C:
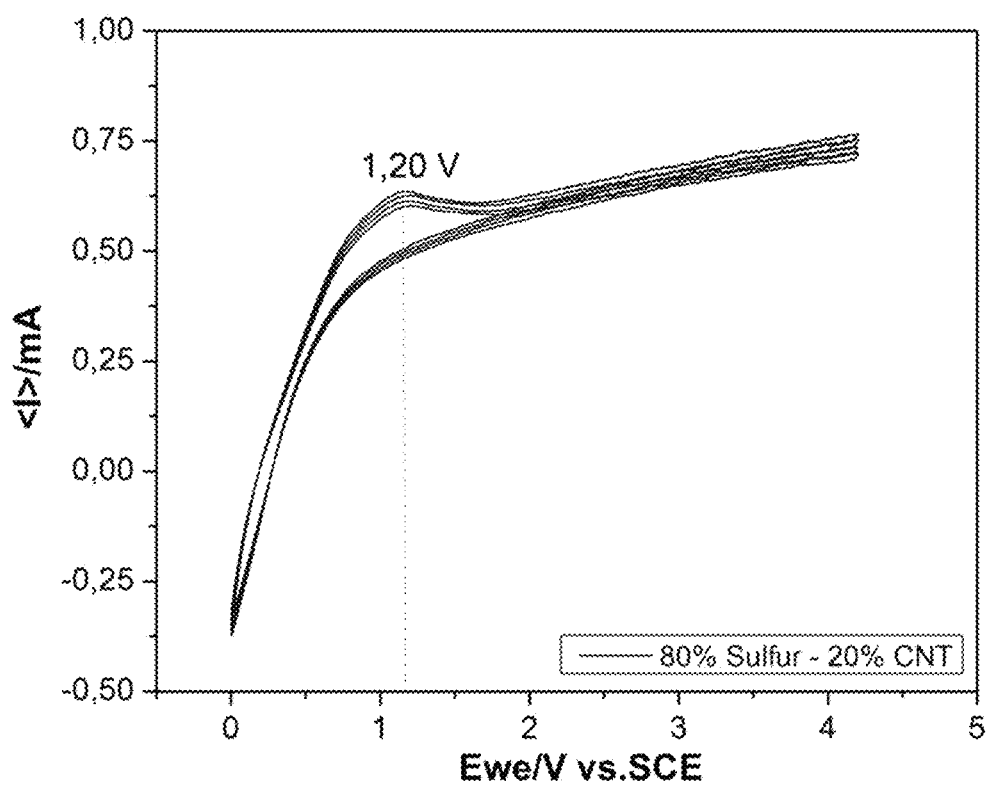

FIG. 10A to FIG. 12C are respectively voltage-current graphs showing results of evaluation of suitability of a PAES-g-PEG binder for a PAES-g-PEG electrolyte membrane according to the present disclosure of Experimental Example H according to the present disclosure. FIG. 10A-10E is a voltage-current graph of a positive-electrode using $LiCoO_2$ and a PAES-g-PEG binder containing a LiTFSI salt of each of various concentrations in an all-solid-state battery system. FIG. 11A-11E is a voltage-current graph of a positive-electrode using LiNiMnCoO$_2$ and a PAES-g-PEG binder containing a LiTFSI salt of each of various concentrations in an all-solid-state battery system. FIG. 12A-12C is a voltage-current graph at a varying ratio between sulfur and CNT in an all-solid-state battery system.

Referring to FIG. 10A to FIG. 12C, it may be identified that the fluctuations in both the oxidation and reduction voltage peaks of the positive-electrodes and the voltage-current curves thereof after several charge and discharge cycles are not large. This indicates that when the PAES-g-PEG binder is used for the positive-electrode, the secondary battery performance may be stably maintained in a similar level to that when the conventional PVDF as a binder is used.

While the present disclosure has been described with reference to preferred embodiments, those skilled in the art will appreciate that the present disclosure may be variously modified and changed without departing from the spirit and scope according to the present disclosure set forth in the following claims.

What is claimed is:

1. An electrolyte membrane for a lithium secondary battery,
   wherein the electrolyte membrane has a lithium ion transfer channel, and
   wherein the electrolyte membrane contains:
      a compound represented by one of following Chemical Formulas 1 to 4; and
      a lithium salt:

[Chemical Formula 1]
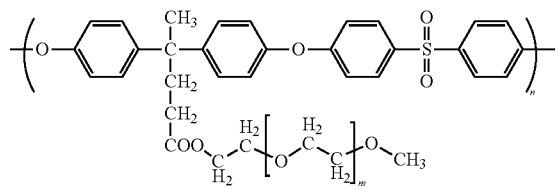

[Chemical Formula 2]
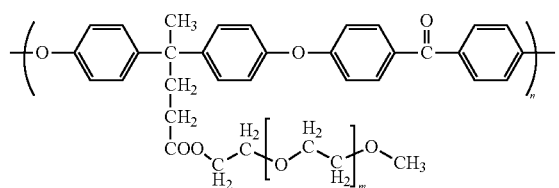

[Chemical Formula 3]
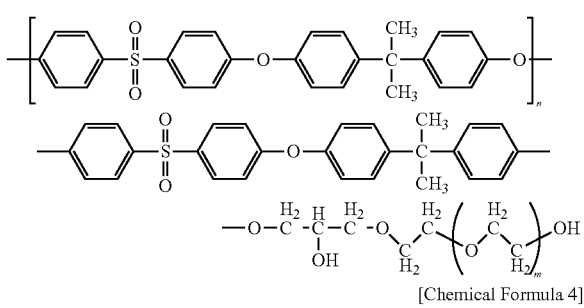

[Chemical Formula 4]
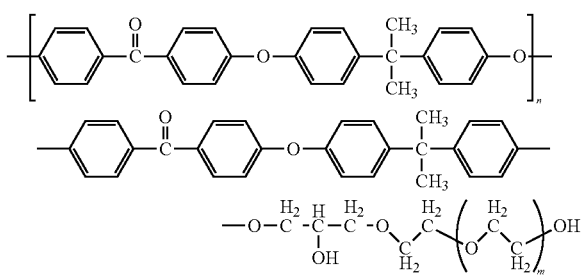

where in the Chemical Formulas 1 to 4, m represents an integer of 45 to 90, and n represents an integer of 50 to 70, and
wherein the lithium salt has a content of 10 to 50 weight % based on a total weight of the electrolyte membrane.

2. The electrolyte membrane of claim 1, wherein the lithium salt includes one selected from a group consisting of LiTFSI (lithium bis(trifluoromethanesulfonyl)), LiPF$_6$, LiBF$_4$, LiSbF$_6$ and LiAsF.

3. The electrolyte membrane of claim 1, wherein the lithium salt has a content of 40 to 50 weight % based on a total weight of the electrolyte membrane.

4. A binder for a lithium secondary battery,
wherein the binder has a lithium ion transfer channel, and
wherein the binder contains:
   a compound represented by one of following Chemical Formulas 1 to 4; and
   a lithium salt:

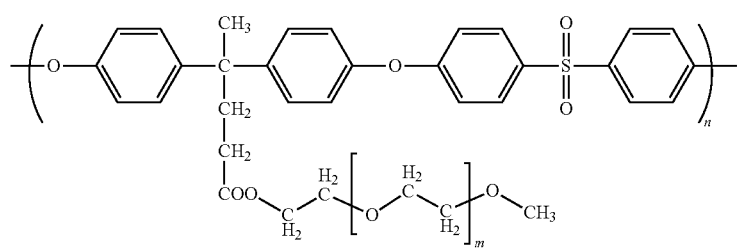

[Chemical Formula 1]

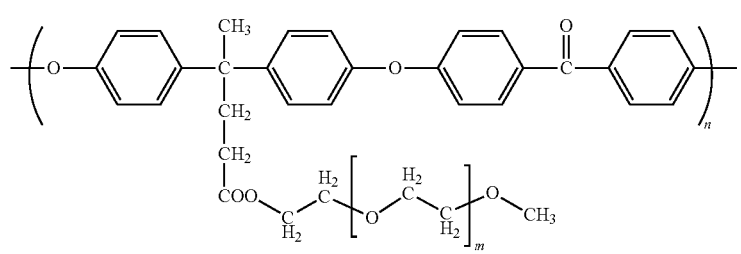

[Chemical Formula 2]

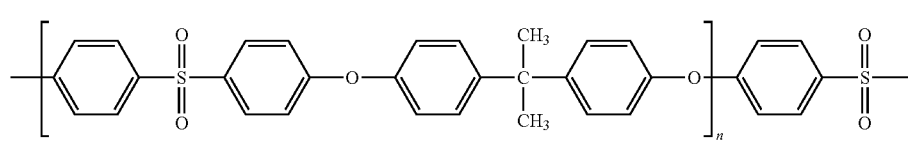

[Chemical Formula 3]

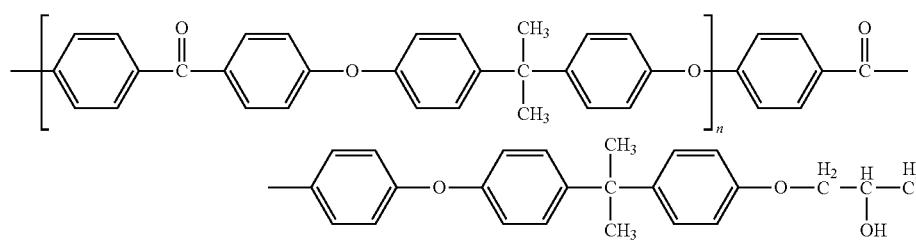

[Chemical Formula 4]

where in the Chemical Formulas 1 to 4, m represents an integer of 45 to 90, and n represents an integer of 50 to 70, and
wherein the lithium salt has a content of 10 to 50 weight % based on a total weight of the binder.

5. The binder of claim 4, wherein the lithium salt includes one selected from a group consisting of LiTFSI (lithium bis(trifluoromethanesulfonyl)), $LiPF_6$, $LiBF_4$, $LiSbF_6$ and LiAsF.

6. The binder of claim 4, wherein the lithium salt has a content of 40 to 50 weight % based on a total weight of the binder.

7. A membrane-electrode structure for a lithium secondary battery,
wherein the structure has a lithium ion transfer channel, and
wherein the structure includes:
   an electrolyte membrane containing:
      a compound represented by one of following Chemical Formulas 1 to 4; and
      a lithium salt;
   a binder having the same composition as the electrolyte membrane; and an electrode binding to the electrolyte membrane via the binder:

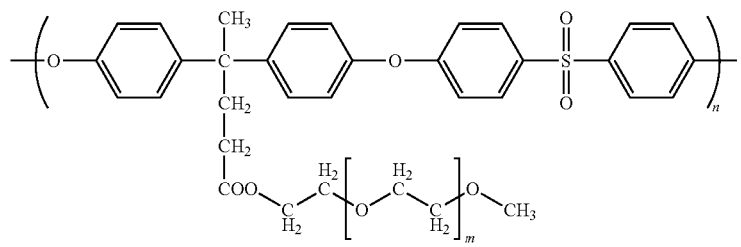

[Chemical Formula 1]

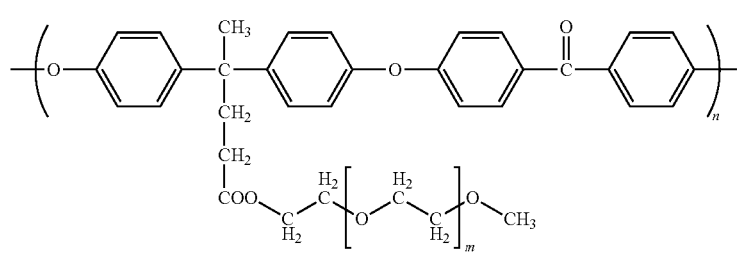

[Chemical Formula 2]

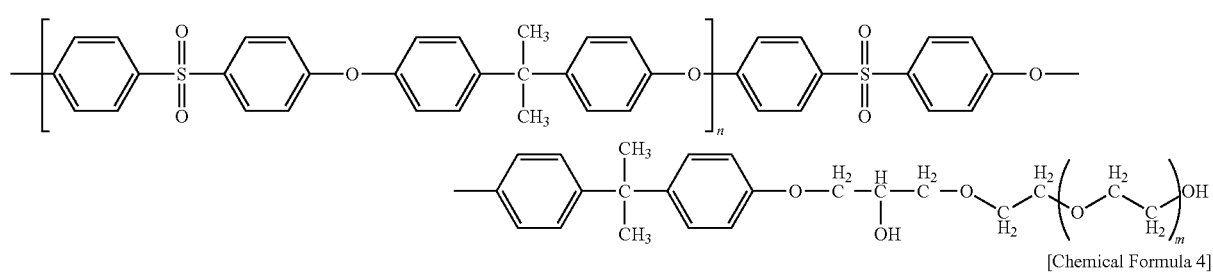

[Chemical Formula 3]

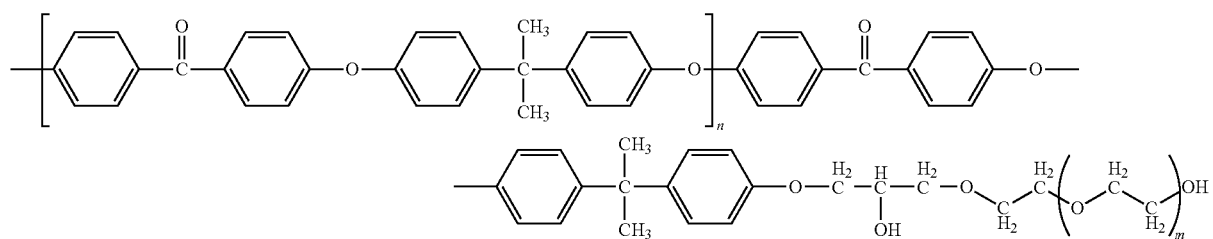

[Chemical Formula 4]

where in the Chemical Formulas 1 to 4, m represents an integer of 45 to 90, and n represents an integer of 50 to 70, and wherein the lithium salt has a content of 10 to 50 weight % based on a total weight of the structure.

8. The membrane-electrode structure of claim 7, wherein an interfacial resistance of the binder with the electrolyte membrane is in a range of 1800 to 2100Ω.

9. The membrane-electrode structure of claim 7, wherein the lithium salt includes one selected from a group consisting of LiTFSl (lithium bis(trifluoromethanesulfonyl)), $LiPF_6$, $LiBF_4$, $LiSbF_6$ and LiAsF.

10. The membrane-electrode structure of claim 7, wherein the lithium salt has a content of 40 to 50 weight % based on a total weight of the structure.

11. The electrolyte membrane of claim 1, wherein the compound is represented by one of following Chemical Formulas 2 to 4.

12. The binder of claim 4, wherein the compound is represented by one of following Chemical Formulas 2 to 4.

13. The membrane-electrode structure of claim 7, wherein the compound is represented by one of following Chemical Formulas 2 to 4.

* * * * *